(12) United States Patent
Alameh et al.

(10) Patent No.: US 8,963,845 B2
(45) Date of Patent: Feb. 24, 2015

(54) MOBILE DEVICE WITH TEMPERATURE SENSING CAPABILITY AND METHOD OF OPERATING SAME

(75) Inventors: Rachid Alameh, Crystal Lake, IL (US); Bill Alberth, Prairie Grove, IL (US); Martin Pais, North Barrington, IL (US); David Winkler, Palatine, IL (US)

(73) Assignee: Google Technology Holdings LLC, Moutain View, CA (US)

( * ) Notice: Subject to any disclaimer, the term of this patent is extended or adjusted under 35 U.S.C. 154(b) by 391 days.

(21) Appl. No.: 12/774,509

(22) Filed: May 5, 2010

(65) Prior Publication Data

US 2011/0273378 A1  Nov. 10, 2011

(51) Int. Cl.
*G06F 1/16* (2006.01)
*H04N 5/33* (2006.01)
*H04M 1/725* (2006.01)
*H04W 52/02* (2009.01)

(52) U.S. Cl.
CPC ...... *H04M 1/72569* (2013.01); *H04M 2250/12* (2013.01); *H04W 52/027* (2013.01); *H04W 52/0274* (2013.01)
USPC .......................................... 345/173; 702/130

(58) Field of Classification Search
CPC ..................... H04M 1/72569; H04M 2250/12
USPC ........ 323/276; 455/411; 250/201.1; 340/501; 331/176; 345/173; 702/130
See application file for complete search history.

(56) References Cited

U.S. PATENT DOCUMENTS

| 4,286,289 A | 8/1981 | Ottesen et al. |
| 4,806,709 A | 2/1989 | Evans |

(Continued)

FOREIGN PATENT DOCUMENTS

| CN | 1407506 A | 4/2003 |
| CN | 101019089 A | 8/2007 |

(Continued)

OTHER PUBLICATIONS

Specification of the Bluetooth System: Master Table of Contents & Compliance Requirements; Covered Core Package V.3.0+HS; Apr. 21, 2009, 192 pages.

(Continued)

*Primary Examiner* — Quan-Zhen Wang
*Assistant Examiner* — Xuemei Zheng
(74) *Attorney, Agent, or Firm* — Shumaker & Sieffert, P.A.

(57) ABSTRACT

The present invention relates to electronic devices such as mobile devices, and methods of operating such devices. In one embodiment of the invention, the electronic device includes first and second temperature sensors positioned at different respective locations on the electronic device and at least one processing device. The first and second temperature sensors respectively output first and second signals indicative of the respective temperatures experienced at those respective sensors. The at least one processing device (i) receives the first and second signals respectively from the first and second temperature sensors respectively and generates based thereon an indication of a difference or a relationship between the first and second temperatures, and (ii) determines an operational context of the electronic device based at least in part upon the difference. In an additional embodiment, other sensor information from one or more other sensors is taken into account in determining the operational context.

17 Claims, 11 Drawing Sheets

(56) References Cited

U.S. PATENT DOCUMENTS

| | | | |
|---|---|---|---|
| 4,914,624 A | 4/1990 | Dunthorn | |
| 4,967,083 A | 10/1990 | Kornbrekke et al. | |
| 5,179,369 A | 1/1993 | Person et al. | |
| 5,414,413 A | 5/1995 | Tamaru et al. | |
| 5,684,294 A | 11/1997 | Kouhi | |
| 5,781,662 A | 7/1998 | Mori et al. | |
| 5,793,486 A | 8/1998 | Gordon et al. | |
| 5,821,521 A | 10/1998 | Bridgelall et al. | |
| 5,880,411 A | 3/1999 | Gillespie et al. | |
| 5,945,988 A | 8/1999 | Williams et al. | |
| 6,002,427 A | 12/1999 | Kipust | |
| 6,088,090 A | 7/2000 | Hoshi et al. | |
| 6,107,994 A | 8/2000 | Harada et al. | |
| 6,147,677 A | 11/2000 | Escobosa et al. | |
| 6,184,538 B1 | 2/2001 | Bandara et al. | |
| 6,185,950 B1 | 2/2001 | Baruschke et al. | |
| 6,215,116 B1 | 4/2001 | Van Marcke | |
| 6,246,407 B1 | 6/2001 | Wilks et al. | |
| 6,246,862 B1 | 6/2001 | Grivas | |
| 6,292,674 B1 | 9/2001 | Davis | |
| 6,330,457 B1 | 12/2001 | Yoon | |
| 6,438,752 B1 | 8/2002 | McClard | |
| 6,460,183 B1 | 10/2002 | Van Der Vleuten | |
| 6,517,257 B2 | 2/2003 | Nishikawa et al. | |
| 6,525,854 B1 | 2/2003 | Takahashi et al. | |
| 6,666,081 B1 | 12/2003 | Babinsky et al. | |
| 6,681,056 B1 | 1/2004 | Tseng et al. | |
| 6,703,599 B1 | 3/2004 | Casebolt et al. | |
| 6,721,954 B1 | 4/2004 | Nickum | |
| 6,804,012 B2 | 10/2004 | Gombert | |
| 6,816,154 B2 | 11/2004 | Wong et al. | |
| 6,925,413 B2 | 8/2005 | Krieg et al. | |
| 6,933,922 B2 | 8/2005 | Casebolt et al. | |
| 6,941,161 B1 | 9/2005 | Bobisuthi et al. | |
| 7,012,637 B1 | 3/2006 | Blume et al. | |
| 7,046,230 B2 | 5/2006 | Zadesky et al. | |
| 7,134,092 B2 | 11/2006 | Fung et al. | |
| 7,166,966 B2 | 1/2007 | Naugler, Jr. et al. | |
| 7,212,835 B2 | 5/2007 | Mantyjarvi et al. | |
| 7,220,958 B2 | 5/2007 | Kitamura et al. | |
| 7,224,382 B2 | 5/2007 | Baker | |
| 7,237,929 B2 | 7/2007 | Stahl | |
| 7,324,671 B2 | 1/2008 | Li et al. | |
| 7,327,245 B2 * | 2/2008 | Krumm et al. | 340/501 |
| 7,339,580 B2 | 3/2008 | Westerman et al. | |
| 7,340,077 B2 | 3/2008 | Gokturk et al. | |
| 7,368,703 B2 | 5/2008 | De Samber et al. | |
| 7,380,716 B2 | 6/2008 | Yokoyama | |
| 7,468,689 B2 | 12/2008 | Ma et al. | |
| 7,486,386 B1 | 2/2009 | Holcombe et al. | |
| 7,489,297 B2 | 2/2009 | Hohmann et al. | |
| 7,515,177 B2 | 4/2009 | Yoshikawa | |
| 7,519,918 B2 | 4/2009 | Trantow | |
| 7,532,196 B2 | 5/2009 | Hinckley | |
| 7,534,988 B2 | 5/2009 | Kong et al. | |
| 7,557,965 B2 | 7/2009 | Taylor et al. | |
| 7,561,146 B1 | 7/2009 | Hotelling | |
| 7,576,525 B2 * | 8/2009 | So et al. | 323/276 |
| 7,580,725 B2 | 8/2009 | Delker et al. | |
| 7,630,716 B2 | 12/2009 | Tamura et al. | |
| 7,687,774 B2 | 3/2010 | Ohta et al. | |
| 7,688,283 B2 | 3/2010 | Jung et al. | |
| 7,715,723 B2 | 5/2010 | Kagawa et al. | |
| 7,721,310 B2 | 5/2010 | Schaffer et al. | |
| 7,728,958 B2 | 6/2010 | Pfaff | |
| 7,795,584 B2 | 9/2010 | Mok et al. | |
| 7,814,791 B2 | 10/2010 | Andersson et al. | |
| 7,855,716 B2 | 12/2010 | McCreary et al. | |
| 7,912,376 B2 | 3/2011 | Rollins | |
| 7,967,451 B2 | 6/2011 | Chen et al. | |
| 7,971,156 B2 | 6/2011 | Albertson et al. | |
| 7,991,575 B2 | 8/2011 | Vogel et al. | |
| 7,991,896 B2 | 8/2011 | Shen et al. | |
| 7,994,468 B2 | 8/2011 | Duijve et al. | |
| 7,995,041 B2 | 8/2011 | Chang | |
| 8,006,002 B2 | 8/2011 | Kalayjian et al. | |
| 8,013,904 B2 | 9/2011 | Tan et al. | |
| 8,018,501 B2 | 9/2011 | Sasaki | |
| 8,023,061 B2 | 9/2011 | Ra | |
| 8,030,914 B2 | 10/2011 | Alameh et al. | |
| 8,072,469 B2 | 12/2011 | Ottney | |
| 8,104,113 B2 | 1/2012 | Rodenbeck et al. | |
| 8,335,593 B2 | 12/2012 | Johnson et al. | |
| 8,633,901 B2 | 1/2014 | Orr et al. | |
| 2001/0019338 A1 | 9/2001 | Roth | |
| 2001/0033475 A1 | 10/2001 | Lillios et al. | |
| 2002/0104081 A1 | 8/2002 | Candelore et al. | |
| 2002/0122072 A1 | 9/2002 | Selker | |
| 2002/0199186 A1 | 12/2002 | Ali et al. | |
| 2003/0034439 A1 | 2/2003 | Reime et al. | |
| 2003/0063128 A1 | 4/2003 | Salmimaa et al. | |
| 2003/0129964 A1 * | 7/2003 | Kohinata et al. | 455/411 |
| 2003/0222917 A1 | 12/2003 | Trantow | |
| 2004/0183787 A1 | 9/2004 | Geaghan et al. | |
| 2004/0207997 A1 | 10/2004 | Stewart et al. | |
| 2005/0104860 A1 | 5/2005 | McCreary et al. | |
| 2005/0150697 A1 | 7/2005 | Altman et al. | |
| 2005/0198029 A1 | 9/2005 | Pohja et al. | |
| 2005/0232447 A1 | 10/2005 | Shinozuka et al. | |
| 2005/0289182 A1 | 12/2005 | Pandian et al. | |
| 2006/0010400 A1 | 1/2006 | Dehlin et al. | |
| 2006/0028453 A1 | 2/2006 | Kawabe | |
| 2006/0031786 A1 | 2/2006 | Hillis et al. | |
| 2006/0049152 A1 | 3/2006 | Matus | |
| 2006/0067573 A1 | 3/2006 | Parr et al. | |
| 2006/0125799 A1 | 6/2006 | Hillis et al. | |
| 2006/0132456 A1 | 6/2006 | Anson | |
| 2006/0161870 A1 | 7/2006 | Hotelling et al. | |
| 2006/0161871 A1 | 7/2006 | Hotelling et al. | |
| 2006/0256074 A1 | 11/2006 | Krum et al. | |
| 2007/0057955 A1 | 3/2007 | McKay | |
| 2007/0058255 A1 | 3/2007 | Imai et al. | |
| 2007/0109266 A1 | 5/2007 | Davis et al. | |
| 2007/0137462 A1 | 6/2007 | Barros et al. | |
| 2007/0177803 A1 | 8/2007 | Elias et al. | |
| 2007/0180392 A1 | 8/2007 | Russo | |
| 2007/0195074 A1 | 8/2007 | Gelissen | |
| 2007/0220437 A1 | 9/2007 | Boillot | |
| 2007/0242054 A1 | 10/2007 | Chang et al. | |
| 2007/0247643 A1 | 10/2007 | Nakamura et al. | |
| 2008/0005703 A1 | 1/2008 | Radivojevic et al. | |
| 2008/0006762 A1 * | 1/2008 | Fadell et al. | 250/201.1 |
| 2008/0024454 A1 | 1/2008 | Everest | |
| 2008/0024992 A1 | 1/2008 | Pflueger | |
| 2008/0052643 A1 | 2/2008 | Ike et al. | |
| 2008/0061899 A1 * | 3/2008 | Stolpman | 331/176 |
| 2008/0079902 A1 | 4/2008 | Mandelstam-Manor et al. | |
| 2008/0100928 A1 | 5/2008 | Wilson | |
| 2008/0122803 A1 | 5/2008 | Izadi et al. | |
| 2008/0129688 A1 | 6/2008 | Richardson et al. | |
| 2008/0161870 A1 | 7/2008 | Gunderson | |
| 2008/0165140 A1 | 7/2008 | Christie et al. | |
| 2008/0192005 A1 | 8/2008 | Elgoyhen et al. | |
| 2008/0195735 A1 | 8/2008 | Hodges et al. | |
| 2008/0204427 A1 | 8/2008 | Heesemans et al. | |
| 2008/0211771 A1 | 9/2008 | Richardson | |
| 2008/0219672 A1 | 9/2008 | Tam et al. | |
| 2008/0225041 A1 | 9/2008 | El Dokor et al. | |
| 2008/0240568 A1 | 10/2008 | Tonouchi | |
| 2008/0252595 A1 | 10/2008 | Boillot | |
| 2008/0256494 A1 | 10/2008 | Greenfield | |
| 2008/0259053 A1 | 10/2008 | Newton | |
| 2008/0266083 A1 | 10/2008 | Midholt et al. | |
| 2008/0280642 A1 | 11/2008 | Coxhill et al. | |
| 2008/0297487 A1 | 12/2008 | Hotelling et al. | |
| 2008/0303681 A1 | 12/2008 | Herz et al. | |
| 2008/0309641 A1 | 12/2008 | Harel et al. | |
| 2009/0021488 A1 | 1/2009 | Kali et al. | |
| 2009/0031258 A1 | 1/2009 | Arrasvuori et al. | |
| 2009/0061823 A1 | 3/2009 | Chu | |
| 2009/0092284 A1 | 4/2009 | Breed et al. | |
| 2009/0158203 A1 | 6/2009 | Kerr et al. | |
| 2009/0277697 A1 | 11/2009 | Bolt et al. | |
| 2009/0299633 A1 | 12/2009 | Hawes et al. | |

(56) References Cited

U.S. PATENT DOCUMENTS

| | | | |
|---|---|---|---|
| 2009/0303176 | A1 | 12/2009 | Chen et al. |
| 2010/0167783 | A1 | 7/2010 | Alameh et al. |
| 2010/0271312 | A1 | 10/2010 | Alameh et al. |
| 2010/0271331 | A1 | 10/2010 | Alameh et al. |
| 2010/0295772 | A1 | 11/2010 | Alameh et al. |
| 2010/0295773 | A1 | 11/2010 | Alameh et al. |
| 2010/0295781 | A1 | 11/2010 | Alameh et al. |
| 2010/0297946 | A1 | 11/2010 | Alameh et al. |
| 2010/0299390 | A1 | 11/2010 | Alameh et al. |
| 2010/0299642 | A1 | 11/2010 | Merrell et al. |
| 2011/0006190 | A1 | 1/2011 | Alameh et al. |
| 2011/0009194 | A1 | 1/2011 | Gabai et al. |
| 2011/0012716 | A1 | 1/2011 | Miller, IV |
| 2011/0014983 | A1 | 1/2011 | Miller, IV |
| 2011/0148752 | A1 | 6/2011 | Alameh et al. |
| 2012/0068952 | A1 | 3/2012 | Slaby et al. |
| 2012/0072044 | A1 | 3/2012 | Slaby et al. |
| 2012/0072157 | A1 | 3/2012 | Alameh et al. |

FOREIGN PATENT DOCUMENTS

| | | | |
|---|---|---|---|
| CN | 101305337 A | | 11/2008 |
| CN | 1805568 A | | 12/2008 |
| DE | 2636706 A1 | | 4/1977 |
| DE | 3634244 A1 | | 4/1988 |
| EP | 1103132 B1 | | 5/2001 |
| EP | 1445922 A1 | | 8/2004 |
| EP | 1553427 A1 | | 7/2005 |
| EP | 1657819 A2 | | 5/2006 |
| EP | 1760573 A2 | | 3/2007 |
| EP | 2000896 A2 | | 12/2008 |
| EP | 20037349 A2 | | 3/2009 |
| FR | 2581204 A1 | | 4/1985 |
| JP | 55084903 A | | 6/1980 |
| JP | 02280427 A | | 11/1990 |
| JP | 2005293419 A | | 10/2005 |
| JP | 2006010489 A | | 1/2006 |
| JP | 2007042020 A | | 2/2007 |
| JP | 2009085799 A | | 4/2009 |
| WO | 9528777 A1 | | 10/1995 |
| WO | 0241129 A2 | | 6/2002 |
| WO | 03023701 A2 | | 3/2003 |
| WO | 03076870 A1 | | 9/2003 |
| WO | 2005076542 A1 | | 8/2005 |
| WO | 2005101176 A2 | | 10/2005 |
| WO | 2008016394 A2 | | 2/2008 |
| WO | 2008073289 A3 | | 6/2008 |

OTHER PUBLICATIONS

G.Yun and M.Kavehrad, "Spot diffusing and fly-eye receivers for indoor infrared wireless communications", Proc. 1992 IEEE, Conf. Sel, Topics in Wireless Comm., Vancouver, BC, Canada, Jun. 25-26, 1992, pp. 286-292.
Kahn, J.M.; You, R., Djahani, P., Weisbin, A.G."Imaging Diversity Receivers for high-speed infrared wireless communication", IEEE Communications Mag., Dec. 1998, Accessed May 7, 2009; 7 pages.
Ward, A.; Jones A.; Hopper A.; "A new location technique for the active office"; IEEE Personal Communications, 1997; 0 accessed May 7, 2009; 11 pages.
Metzger, C.; Anderson, M.; Starner, T., "FreeDigiter: A contact-free device for gesture control"; Wearable Computers, 2004; ISWC 2004, 8th International Symposium, vol. 1, Oct. 31/Oct. 4,2004, pp. 18-21.
Von Hardenberg, C.; Berard F.; "Bare-hand human-computer interaction" PUI; ACM 1-58113-448-7 Nov. 14, 2001; 0 Orlando, FL, USA; 8 pages.
TrackIR: Vector Expansion: True 6DOF view control offer 3-dimensional virtual reality via motion control; TrackIR by NaturalPoint; www.naturalpoint.com; 2 pages 2005-08.
Bricklin, D.; Gestures, the iPhone, and Standards: A Developer's Questions, www.bricklin.com, 10 pages, 1999-2009.
Gearlog, Microsoft's sidesight: something Apple show watch, www.gearlog.com; 5 pages, 1996-2008, Zift Davis Publ. Holdings, Inc.
Hadamard transform—Wikipedia definition; http://en.wikipedia.org/wikilHadamard_transform; 4 pages, Oct. 2009.
Silicon Laboratories, Inc.; Si1120 Evaluation Kit User's Guide, Austin, TX, Dec. 2009, 10 pages; www.silabs.com/supporttpages/contacttechnicalsupport.aspx.
Pavlov, Vladislav et al.: "Model-based object characterization with active infrared sensor array", IEEE Sensors 2007 Conference, 280-31 Oct. 2007, 1-4244-1262-5/07/2007, pp. 360-363.
Christensen, Henrik Vie: "Retrieval of 3D-Position of a Passive Object Using infrared LED's and Photodiodes", Acoustics Speech and Signal Processing 2005, Proceedigns ICASSP 05 IEEE International Conference on (2005), vol. 4, pp. iv/1093-iv/1096 vol. 4.
Patent Cooperation Treaty, International Search Report and Written Opinion of the International Searching Authority for International Application No. PCT/US2011/031161, Nov. 18, 2011, 14 pages.
Harrison, C.; Hudson, S.E.; Lightweight Material Detection for Placement-Aware Mobile Computing; Human-Computer Interaction Institute, Carnegie Mellon University; Pittsburg, PA, USA; Oct. 2008; 4 pages.
Kumar, S.R.; Kasiviswanathan, S.; "A hot probe setup for the measurement of Seebeck coefficient of thin wires and thin files using integral method" ; Review of Scientific Instruments 79, 024302, 2008; Dept. of Physics, Indian Institute of Technology Madras, Chennai, Tamilnadu, India, 4 pages.
U.S. Appl. No. 12/471,062, filed May 22, 2009, "Sensing assembly for mobile device."
United States Patent and Trademark Office "Non-Final Rejection" for U.S. Appl. No. 12/471,062 Feb. 22, 2012, 15 pages.
Kim, et al., "The gesture watch: a wireless contact-free gesture based wrist interface", 2007, 11th IEEE International Symposium on Wearable Computers, pp. 15-22.
United States Patent and Trademark Office "Non-Final Rejection" for U.S. Appl. No. 12/646,601 Feb. 14, 2012, 9 pages.
Starner et al., The gesture pendant: A self-illuminating, wearable, infared computer vision system for home automation control and medical monitoring:, 2000, IEEE 4th Internatioinal Symposium on Wearable Computers, pp. 87-94.
H. Ruser, Object recognition with a smart low-cost active infared sensor array:, Nov. 21-23, 2005, 1st International Conference on Sensing Technology, pp. 494-499.
United States Patent and Trademark Office "Final Rejection" for U.S. Appl. No. 12/428,187 Apr. 10, 2012, 10 pages.
United States Patent and Trademark Office "Final Rejection" for U.S. Appl. No. 12/428,266 Mar. 14, 2012, 9 pages.
United States Patent and Trademark Office "Non-Final Rejection" for U.S. Appl. No. 12/500,625 Dec. 29, 2011, 7 pages.
United States Patent and Trademark Office "Non-Final Rejection" for U.S. Appl. No. 12/646,199 Mar. 9, 2012, 17 pages.
United States Patent and Trademark Office "Non-Final Rejection" for U.S. Appl. No. 12/645,244 May 24, 2012, 8 pages.
United States Patent and Trademark Office "Non-Final Rejection" for U.S. Appl. No. 12/648,503 Feb. 2, 2012, 7 pages.
European Patent Office, "Extended Search Report" for European Patent Application No. 0936659.4 dated Mar. 15, 2013, 13 pages.
United States Patent and Trademark Office, "Non-Final Rejection" for U.S. Appl. No. 13/307,334 dated Mar. 28, 2014, 9 pages.
The State Intellectual Property Office of the People's Republic of China, "Notification of the First Office Action" for Chinese Patent Application No. 201080022152.1 dated Oct. 25, 2013, 11 pages.
United States Patent and Trademark Office "Non-Final Rejection" for U.S. Appl. No. 12/641,830 Sep. 20, 2012, 8 pages.
United States Patent and Trademark Office "Non-Final Rejection" for U.S. Appl. No. 12/428,187 Sep. 24, 2012, 8 pages.
The State Intellectual Property Office of the People's Republic of China, "Notification of the First Office Action" for Chinese Patent Application No. 201080031007.X dated Dec. 18, 2013, 9 pages.
United States Patent and Trademark Office "Final Rejection" for U.S. Appl. No. 12/646,199 Sep. 17, 2012, 21 pages.
McKenna, Michael "Interactive Viewpoint Control and Three-Dimensional Operations" Proceedings of the 1992 Symposium on Interactive 3D Graphics, 1992, pp. 53-56.

(56) References Cited

OTHER PUBLICATIONS

United States Patent and Trademark Office, "Notice of Allowance and Fees Due" for U.S. Appl. No. 13/307,150 dated Feb. 21, 2014, 10 pages.

Response to Office Action from U.S. Appl. No. 13/307,334, dated Mar. 28, 2014, filed Jun. 30, 2014, 5 pp.

Office Action from Chinese Application No. 201180022502.9, dated Oct. 10, 2014, 14 pp.

Office Action from U.S. Appl. No. 13/307, 232, dated Nov. 21, 2014, 6 pp.

Office Action from U.S. Appl. No. 13/307,334, dated Dec. 3, 2014, 21 pp.

\* cited by examiner

MOBILE DEVICE WITH TEMPERATURE SENSING CAPABILITY AND METHOD OF OPERATING SAME

CROSS-REFERENCE TO RELATED APPLICATIONS

. . .

STATEMENT REGARDING FEDERALLY SPONSORED RESEARCH OR DEVELOPMENT

. . .

FIELD OF THE INVENTION

The present invention relates generally to mobile devices and, more particularly, to mobile devices with component(s) allowing for the mobile devices to have temperature sensing capabilities, as well as to methods of operating such mobile devices.

BACKGROUND OF THE INVENTION

Mobile devices such as cellular telephones, smart phones and other handheld or portable electronic devices such as personal digital assistants (PDAs), headsets, MP3 players, etc. have become popular and ubiquitous. Such mobile devices now often include numerous different types of input devices and/or sensors that allow for the mobile device to sense/receive signals indicative of a variety of user commands and/or operational conditions. For example, many mobile devices now include not merely buttons that can be pressed by a user, but also input devices such as touch sensitive screens or navigation devices. Also, many mobile devices now include other sensors such as sensors that can detect incoming light signals such as infrared signals, as well as sensors that sense position or movement of the mobile device including, for example, accelerometers.

The operational conditions or context of a mobile device can be of interest for a variety of reasons. Yet, despite the number of different types of input devices/sensors that are already implemented in conventional mobile devices, there still remain a variety of operational conditions that cannot be easily detected, or detected at all, by way of such existing input devices/sensors. Indeed, the use of conventional input devices/sensors can be impeded by particular circumstances so as to preclude accurate determinations regarding certain types of operational conditions.

Therefore, for the above reasons, it would be advantageous if mobile device(s) could be developed that had improved capabilities in terms of detecting one or more mobile device operational conditions.

BRIEF SUMMARY OF THE INVENTION

In at least some embodiments, the present invention relates to an electronic device comprising a first temperature sensing device, a second temperature sensing device, and at least one processing device. The first temperature sensing device is positioned at a first location at or proximate to an exterior surface of the electronic device and that provides a first signal indicative of a first temperature experienced by the first temperature sensing device. The second temperature sensing device is positioned at a second location at or proximate to the exterior surface of the electronic device and that provides a second signal indicative of a second temperature experienced by the second temperature device. The at least one processing device (i) receives the first and second signals respectively from the first and second temperature sensing devices respectively and generates based thereon an indication of a difference or a relationship between the first and second temperatures, and (ii) determines an operational context of the electronic device based at least in part upon the difference. In at least some such embodiments, the electronic device is a mobile device. Also, in at least some such embodiments, additional sensor information is further taken into account in determining the operational context.

In at least one additional embodiment, the present invention relates to a method of determining an operational context of an electronic device. The method includes generating a first signal indicative of a first temperature at a first temperature sensing device positioned proximate an exterior surface of the electronic device, and generating a second signal indicative of a second temperature at a second temperature sensing device positioned proximate the exterior surface of the electronic device. The method also includes determining a temperature difference based upon the first and second signals, and predicting the operational context of the electronic device at least in part based upon the determined temperature difference.

In at least one further embodiment, the present invention relates to a method of operating an electronic device. The method includes determining an expected thermal profile value based at least in part upon an operational mode of the electronic device by consulting data stored on the electronic device, and generating at least one signal indicative of an actual thermal profile value experienced between first and second temperature sensing devices positioned at first and second locations, respectively, proximate an exterior surface of the electronic device. The method further includes obtaining at least one additional signal indicative of one or more of touching of a touch sensor, physical positioning of the electronic device, vibration experienced by the electronic device, darkness level about the electronic device, image information received at the electronic device, or electrical isolation of the electronic device. Additionally, the method includes predicting an operational context of the electronic device based upon the expected thermal profile value, the actual thermal profile, and the at least one additional signal, and taking at least one action upon the predicting of the operational context.

DETAILED DESCRIPTION OF THE INVENTION

Figure 2:
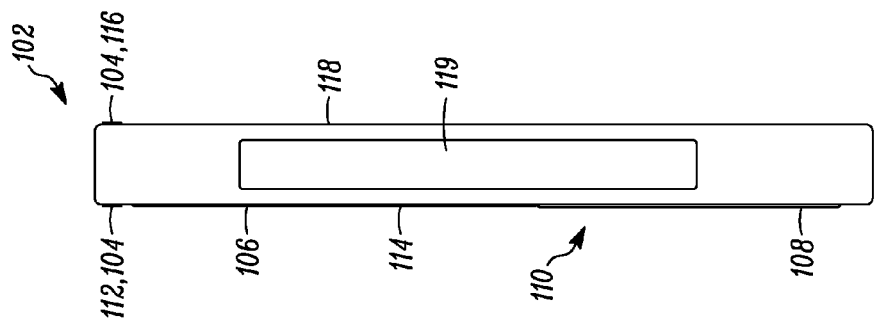
FIGS. 1 and 2 are front and side elevation views, respectively, of an exemplary mobile device that includes temperature sensing componentry that allows for differential temperature sensing, in accordance with one embodiment of the present invention.
Figure 1:
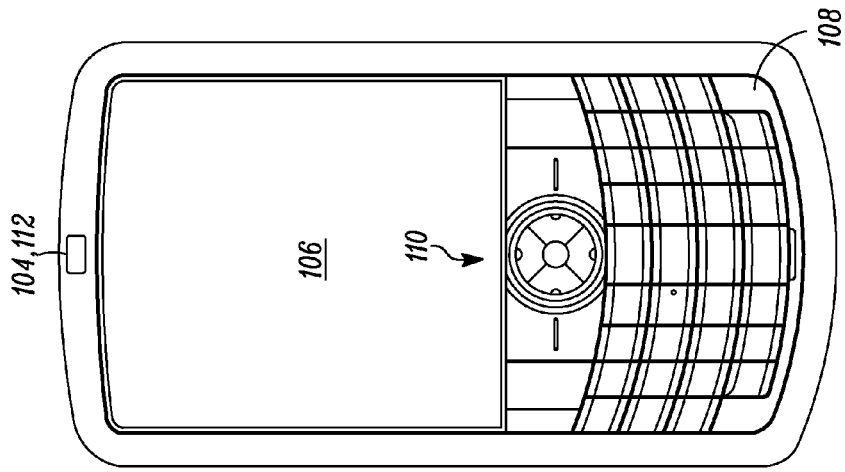

Referring to FIGS. 1 and 2, respectively, front and side elevation views are provided respectively of an exemplary mobile device 102 that includes temperature sensing componentry 104 that allows for detection of a temperature differential existing between different locations on the mobile device, in accordance with a first embodiment of the present invention. In the present example shown, the mobile device 102 is a personal digital assistant (PDA), albeit the mobile device is also intended to be representative of a variety of other mobile/portable devices that are encompassed within the scope of the present invention including, for example, cellular telephones, smart phones, other handheld or portable electronic devices, headsets, MP3 players, battery-powered devices, wearable devices, radios, navigation devices, pagers, and other mobile devices. Further included among the components of the mobile device 102 as shown in FIGS. 1 and 2 are a video screen (display) 106, a keypad 108 having alpha-numeric keys, a navigation device (in this case, a "five-way navigation area") 110, and a side touch sensor 119 (particularly visible in FIG. 2). The video screen 106 can in some circumstances also be a touch-screen.

In the embodiment of FIGS. 1 and 2, the temperature sensing componentry 104 more particularly includes a first temperature sensing device 112 positioned along a front side 114 of the mobile device 102 and also a second temperature sensing device 116 positioned along a rear side 118 of the mobile device. As will be described further with respect to FIGS. 3-4 below, temperature signals are provided from the first and second temperature sensing devices 112, 116 that are indicative of the temperatures at those respective temperature sensing devices. By virtue of processing performed by the mobile device 102 utilizing the information communicated by way of the temperature signals, the mobile device is able to sense a temperature differential existing between the temperatures sensed by the two sensing devices (or two groups of sensing devices) which is indicative of a temperature differential existing between the locations at which those two sensing devices (or groups of sensing devices) are positioned on the front and rear sides 114, 118 of the mobile device. This temperature differential information is then used in combination with other information obtained via other types of sensors by the mobile device 102 to determine/predict an operational condition or context of the mobile device.

Figure 3:
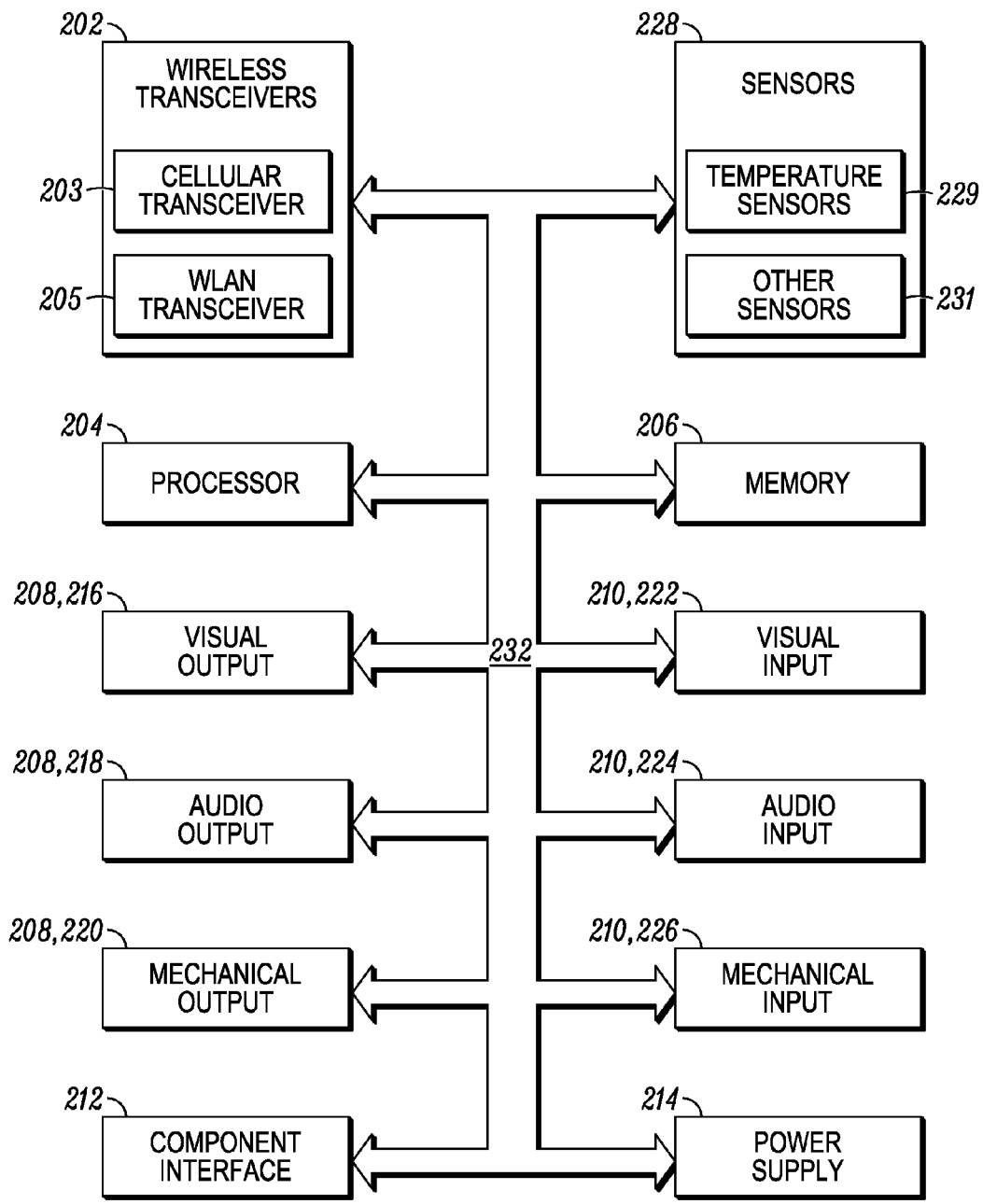
FIG. 3 is a block diagram illustrating exemplary components of the mobile device of FIG. 1, including the temperature sensing componentry.

Referring additionally to FIG. 3, there is provided a block diagram illustrating exemplary internal components 200 of the mobile device 102, in accordance with one embodiment of the present invention. The exemplary embodiment includes wireless transceivers 202, a processor 204 (e.g., a microprocessor, microcomputer, application-specific integrated circuit, etc.), a memory portion 206, one or more output devices 208, and one or more input devices 210. In at least some embodiments, a user interface is present that comprises one or more of the output devices 208 and one or more of the input device 210. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device 102 to be portable. As described in further detail below, the internal components 200 further include a plurality of sensors 228. All of the internal components 200 can be coupled to one another, and in communication with one another, by way of one or more internal communication links 232 (e.g., an internal bus).

Each of the wireless transceivers 202 utilizes a wireless technology for communication, such as, but not limited to, cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF, Bluetooth and IEEE 802.11 (a, b, g or n), or other wireless communication technologies such as infrared technology. In the present embodiment, the wireless transceivers 202 include both cellular transceivers 203 and a wireless local area network (WLAN) transceiver 205 (which particularly can employ infrared technology), although in other embodiments only one of these types of wireless transceivers (and possibly neither of these types of wireless transceivers, and/or other types of wireless transceivers) is present. Also, the number of wireless transceivers can vary and, in some embodiments, only one wireless transceiver is present. Further, depending upon the embodiment, each wireless transceiver 202 can include both a receiver and a transmitter, or only one or the other of those devices.

Exemplary operation of the wireless transceivers 202 in conjunction with others of the internal components 200 of the mobile device 102 can take a variety of forms and can include, for example, operation in which, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals to a remote device, such as a cell tower or a remote server (not shown).

Depending upon the embodiment, the input and output devices 208, 210 of the internal components 200 can include a variety of visual, audio and/or mechanical outputs. For example, the output device(s) 208 can include a visual output device 216 such as a liquid crystal display and light emitting diode indicator, an audio output device 218 such as a speaker, alarm and/or buzzer, and/or a mechanical output device 220 such as a vibrating mechanism. The visual output devices 216 among other things can include the video screen 106 of FIG. 1. Likewise, by example, the input devices 210 can include a visual input device 222 such as an optical sensor (for example, a camera), an audio input device 224 such as a microphone, and a mechanical input device 226 such as a flip sensor, keyboard, keypad, selection button, touch pad, touchscreen, capacitive sensor, motion sensor, and switch. The mechanical input device 226 can in particular include, among other things, the keypad 108 and the navigation device 110 of FIG. 1. Actions that can actuate one or more input devices 210 can include, but need not be limited to, opening the mobile device, unlocking the device, moving the device to actuate a motion, moving the device to actuate a location positioning system, and operating the device.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. The data that is stored by the memory portion 206 can include, but need not be limited to, operating systems, applications, and informational data. Each operating system includes executable code that controls basic functions of the communication device, such as interaction among the various components included among the internal components 200, communication with external devices via the wireless transceivers 202 and/or the component interface 212, and storage and retrieval of applications and data to and from the memory portion 206. Each application includes executable code that utilizes an operating system to provide more specific functionality for the communication devices, such as file system service and handling of protected and unprotected data stored in the memory portion 206. Informational data is non-executable code or information that can be referenced and/or manipulated by an operating system or application for performing functions of the communication device.

Still referring to FIG. 3, as noted above, the internal components 200 in the present embodiment further include the sensors 228. Although one or more of the sensors 228 of the internal components 200 can in at least some circumstances be considered as also being one or more input devices 210 or vice-versa (that is, although the sensors and input devices to some degree can overlap), given the particular significance of one or more of these sensors 228 to the present embodiment the sensors instead are described independently of the input devices 210. In particular as shown, the sensors 228 include both temperature sensors 229 and other sensors 231. To the extent FIG. 3 is intended to show the internal components 200 corresponding to the mobile device 102 of FIGS. 1-2, the temperature sensors 229 in particular include the first and second temperature sensing devices 112, 116. Typically, to allow for differential temperature sensing (that is, sensing of a temperature difference between two different locations, such as two locations on the front and rear sides 114, 118 of the mobile device 102), at least two different sensors are provided. Nevertheless, depending upon the embodiment, the temperature sensors 229 can include any arbitrary number of sensors, and the temperature sensors can include a variety of different types of temperature sensing devices.

With respect to the other sensors 231, these can include any one or more of a variety of different types of sensors. In the present embodiment, the other sensors 231 include the side touch sensor (which can be a single touch sensor or multiple touch sensors) 119, which can be a capacitive touch sensor, a resistive touch sensor, a temperature type sensor, a pressure sensor, an optical sensor, a mechanical sensor, or another type of touch-sensitive component. Additionally, depending upon the embodiment, the other sensors 231 can include, among other things, one or more proximity sensors such as infrared sensors and/or pyramid-type sensing assemblies as are described in U.S. patent application Ser. No. 12/471,062 entitled "Sensing Assembly for Mobile Device," which is hereby incorporated by reference herein. Also for example; depending upon the embodiment, the other sensors 231 can include other types of sensors, such as a darkness/brightness sensor, a vibration sensor, an audio sensor, a location sensor or circuit, a Global Positioning System (GPS) receiver or sensor, a compass, a triangulation receiver, an accelerometer, a gravitometer, a tilt sensor, a gyroscope, a compass, or any other information collecting device that can identify a current location or orientation of the mobile device 102. Although a camera (or other image sensor) was mentioned above as potentially being one of the input sensors 210, such device can also be one of the other sensors 231. As discussed in further detail below, the mobile device 102 (and particularly the processor 204) is able to make determinations regarding operational condition(s)/context(s) and also regarding appropriate responses to those condition/context determinations, based upon signals provided from the temperature sensors 229 and other sensors 231 (including possibly one or more of the input devices 210).

Figure 4:
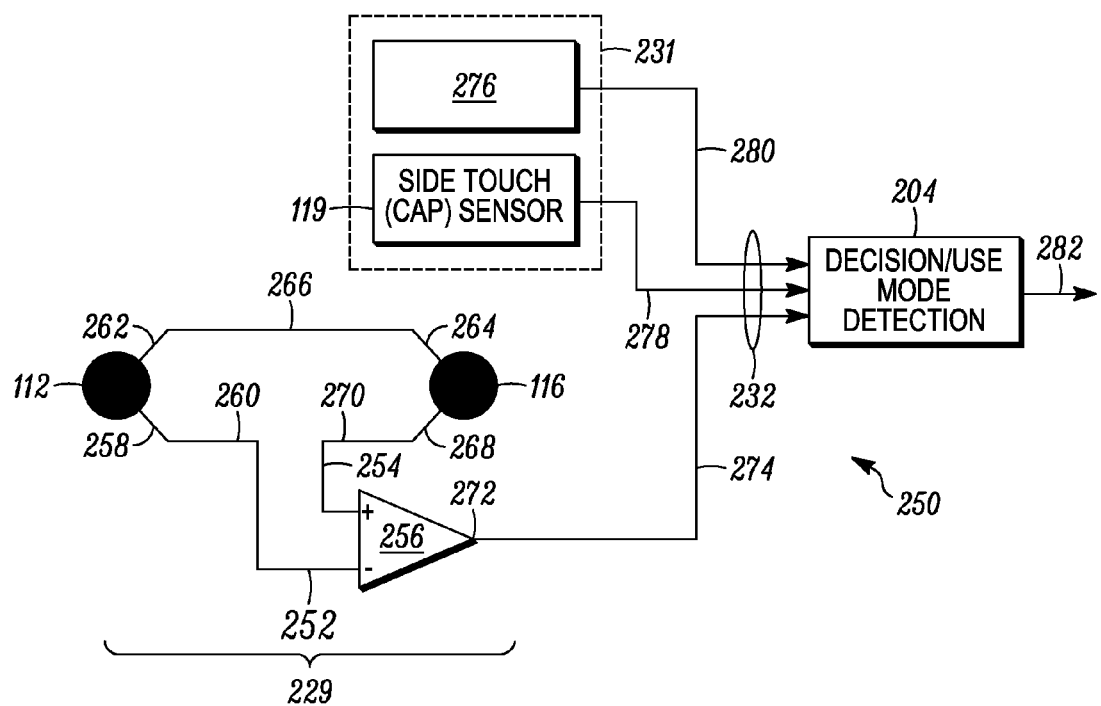
FIG. 4 is a schematic diagram illustrating various sensors and other components of the mobile device of FIGS. 1-3, as well as illustrating how temperature signals from the temperature sensing componentry and other signals from other sensors are provided to and utilized by a processor of the mobile device in one embodiment of the present invention.

Turning to FIG. 4, an electrical schematic diagram 250 is provided showing how signals from temperature sensing devices such as the temperature sensing devices 112, 116 of FIG. 1 can be processed to derive a differential temperature signal, as well as how that differential temperature signal can be processed along with other signals from other supporting sensors. As shown, the temperature sensing devices 112, 116 are coupled in series, between an inverting input 252 and a non-inverting input 254 of an operational amplifier 256. More particularly, a first lead 258 of the first temperature sensing device 112 is coupled to the inverting input 252 by way of a first wire 260, a second lead 262 of the first temperature sensing device is coupled to a first lead 264 of the second temperature sensing device 116 by way of a second wire 266, and a second lead 268 of the second temperature sensing device is coupled to the non-inverting input 254 by way of a third wire 270. In response to input signals (e.g., voltage or current signals) generated by the first and second temperature sensing devices (or groups of devices) 112, 116, the operational amplifier 256 in turn generates an output signal at terminal 272 that is proportional to the differential between the two input signals and thus proportional to the difference in temperatures experienced by the two temperature sensing devices.

Additionally as shown in FIG. 4, the differential temperature output signal provided at the output terminal 272 is in turn sent to the processor 204 by way of a communication link 274 (although not shown, an analog-to-digital converter can be provided as part of the communication link 274 between the output terminal 272 and the processor 204 so that the differential temperature output signal is in digital form when provided to the processor 204). In addition to receiving the differential temperature output signal, the processor 204 also receives one or more signals from one or more of the other sensors 231, for example, the side touch sensor 119 or one or more further sensors 276, by way of additional communication links 278 and 280, respectively. The communication links 274, 278 and 280 can all be considered to constitute as part of, or to be encompassed by, the communication links 232 of the mobile device 102 shown in FIG. 3. It should be further noted that, while for simplicity of illustration in FIG. 3 the operational amplifier 256 and the wires 260, 266, 270 are all considered to be part of the temperature sensors 229 (along with the temperature sensing devices 112, 116), in other embodiments such devices/components other than the specific components that sense temperature can be considered to be distinct from the temperature sensors, and can be located physically apart from the temperature sensors. For example, the operational amplifier 256 can, in another embodiment, be considered part of the processor 204.

Depending upon the signals provided to it from the temperature sensors 229 and the other sensors 231, the processor 204 can determine a variety of operational conditions/contexts as will be discussed in further detail below. Among other things, the processor 204 can in some embodiments or circumstances determine a location or position of the mobile device 102 in relation to a user or some other structure and/or make decisions based upon such determinations. For example, referring to FIG. 14, in some embodiments that are discussed in more detail below, the mobile device 102 is able to determine whether it is within a pocket 284 of a user 286 or within a purse (or other similar bag-like container) 288 of the user. Although not necessarily the case in all embodiments or circumstances, in many embodiments/circumstances, upon performing such determinations, the processor 204 provides one or more output signals 282 to one or more components of the mobile device 102 so as to cause the mobile device to take one or more actions, or to perform one or more operations. The output signals 282 can be provided to other component(s) of the mobile device 102 again by way of the communication links 232 of the mobile device 102.

Notwithstanding the above discussion regarding the placement of temperature sensors on the mobile device 102, the present invention is intended to encompass numerous different embodiments in which temperature sensing devices are positioned at any of a variety of different locations on the mobile device, are implemented within the mobile device in numerous different ways, and have a variety of different types of structural configurations. Referring to FIGS. 5-9, several examples of mobile devices with different arrangements and configurations of temperature sensing devices are shown. It is to be understood, however, that these additional embodiments (as well as the embodiment shown in FIG. 1) are merely examples of the present invention, and that the present invention is intended to encompass numerous other arrangements and configurations as well as those that are shown.

Figure 5:
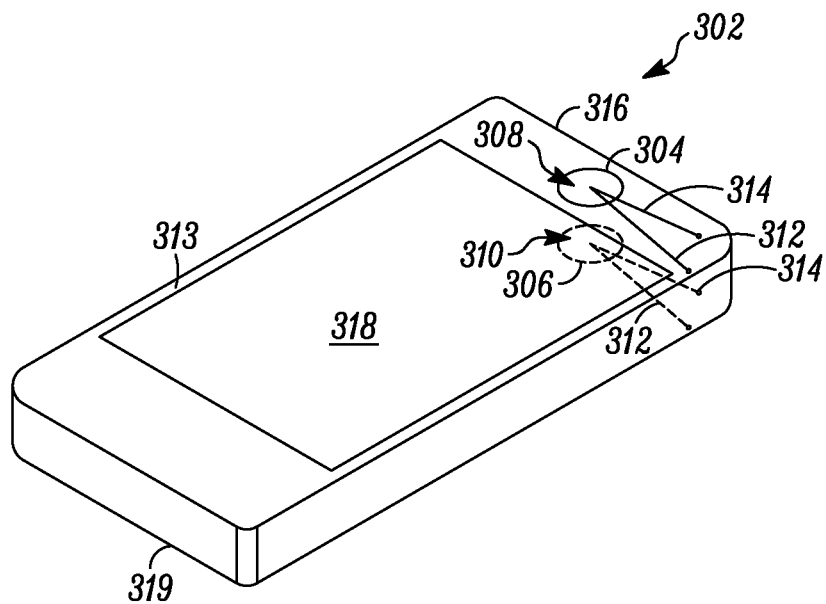
FIGS. 5 and 6 are front perspective views of two further exemplary embodiments of mobile devices having other arrangements of temperature sensing componentry, in accordance with other embodiments of the present invention.

Referring particularly to FIG. 5, an alternate embodiment of a mobile device 302 has features that are similar to those of the mobile device 102 except insofar as the mobile device 302 includes a front logo region 304 as well as a rear logo region 306 (shown in phantom) respectively on a front side 313 and a rear side 319 of the mobile device. It is at (or, more particularly, around and beneath/inwardly of the front logo region 304 and the rear logo region 306, respectively, that front and rear temperature sensitive devices 308 and 310, respectively, are placed. In the embodiment shown, each of the front temperature sensing device 308 and the rear temperature sensing device 310 (which is also shown in phantom) are looped structures that, as discussed in further detail below, in particular include thermocouple junctions that allow for temperature sensing to be accomplished. Given the positioning of the temperature sensing devices 308, 310 adjacent to (underneath) the logo regions 304, 306, the respective temperature sensing devices sense the temperatures along the logo regions due to thermal conduction through those regions. The use of large areas such as the logo regions 304, 306 coupled to the thermocouple junctions of the temperature sensing devices 308, 310 can help to assure user contact with the temperature sensing devices due to the logo large size.

The first and second leads 312 and 314 of the first temperature sensing device 308 can be considered analogous to the leads 258 and 262, respectively, of FIG. 4, while the leads 312 and 314 of the second temperature sensing device 310 can be considered analogous to the first and second leads 264 and 268, respectively, of FIG. 4. Thus, although further components such as the operational amplifier 256 of FIG. 4 are not shown in FIG. 5, it can be presumed that the temperature sensing devices 308, 310 can be operated and provide signals that are utilized in the same or substantially the same manner as was described with respect to FIG. 4. Although the logo regions 304, 306 of the mobile device 302 are shown to be positioned proximate an upper edge surface 316 of the mobile device 302, for example with the logo region 304 particularly being positioned in between the edge surface 316 and a screen 318 of the mobile device, it will be understood that the logo regions could be positioned at a variety of other locations along the front and rear sides 313, 319 of the mobile device, as well as on other surfaces (e.g., the edge surface 316 or other edge/side surfaces) of the mobile device.

Figure 6:
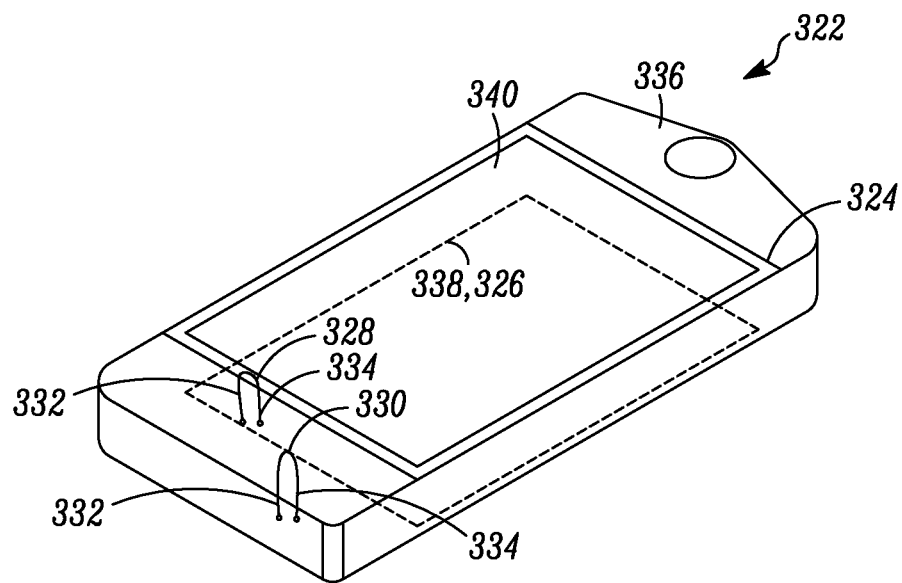

Referring to FIG. 6, a further mobile device 322 is shown to include both a bezel 324 positioned along a front side 336 of the mobile device and a back plate 326 forming a rear surface 338 of the mobile device. As shown, the bezel 324 is a rectangular-shaped structure having an open interior 340, that is, a shape similar to that of a picture frame. It will be understood that, within the interior 340, a display such as the screen 318 of FIG. 5 can be positioned. As with respect to the mobile devices 102 and 302, the mobile device 322 includes first and second temperature sensing devices 328 and 330 that are positioned proximate the front and rear sides 336 and 338, respectively. As shown, the first temperature sensing device 328 is positioned adjacent to the bezel 324 along the interior side of the bezel (that is, not on the side of the bezel forming the exterior of the mobile device 322). The second temperature sensing device 330 is positioned adjacent to the back plate 326 along the interior side of the back plate (again, not along the exterior surface forming the exterior surface of the mobile device 322). The bezel 324 and back plate 326 are heat conductive plates that are either directly exposed to the outside environment or embedded very close to the outer surface of the mobile device.

Each of the temperature sensing devices 328, 330, as with the temperature sensing devices 308, 310, includes a junction allowing for temperature sensing as will be described in further detail below, and includes a respective first lead 332 as well as a respective second lead 334. As was the case with the temperature sensing device 308, 310, the leads 332 of the temperature sensing devices 328, 330 respectively, can be understood to correspond to the leads 258 and 268 of FIG. 4, while the leads 334 of the respective temperature sensing devices can be understood to correspond to the leads 262 and 264 of FIG. 4. Thus, the temperature sensing devices 328, 330 can be implemented in the same or substantially the same manner as discussed with reference to FIG. 4. Given the positioning of the first temperature sensing device 328 along the interior surface of the bezel 324, and given the positioning of the second temperature sensing device 330 along the interior surface of the back plate 326, each of those respective temperature sensing devices senses the temperature of a respective location exterior to the phone along the bezel 324 and back plate 326 by virtue of the conductive communication of heat through the bezel or the back plate, respectively.

Figure 7:
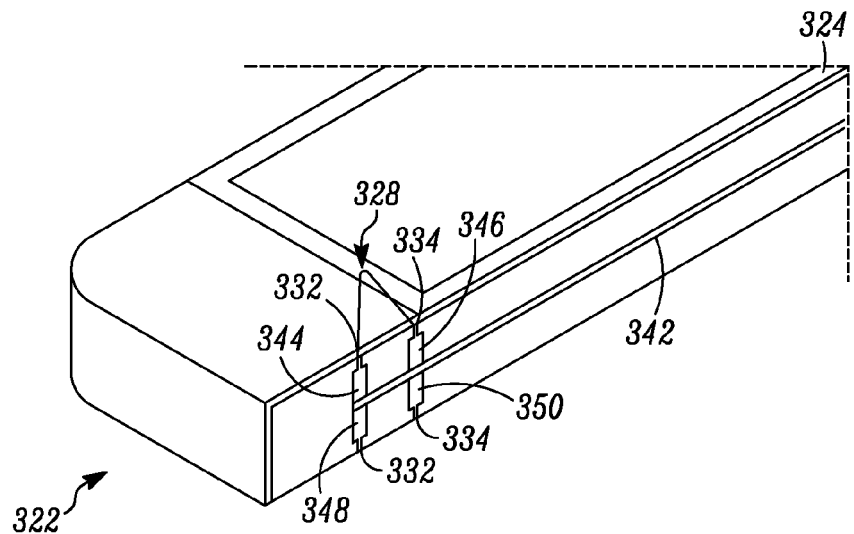
FIGS. 7 and 8 respectively are additional perspective, partly cross-sectional, partly cutaway views of the mobile device of FIG. 6. and a modified version of the mobile device of FIG. 6, respectively.

Referring additionally to FIG. 7, a perspective partly cross-sectional, partly cut-away view of the mobile device 322 of FIG. 6 is provided to show exemplary additional inner components of the mobile device. In particular as shown, the mobile device 322 includes a printed circuit board (PCB) 342 on which can be provided a variety of the electrical components of the mobile device, including, for example, the processor 204 and the memory 206 as well as the network communication links 232 (or portions thereof). In the embodiment of FIG. 7, the PCB 342 is linked to the first and second leads 332, 334 of the first temperature sensing device 328 as well as the second temperature device 330 (not shown) by way of spring contacts. More particularly, a first spring contact 344 links the PCB 342 with the first lead 332 of the first temperature sensing device 328, a second spring contact 346 links the PCB with the second lead 334 of the first temperature sensing device 328, a third spring contact 348 links the PCB with the first lead 332 of the second temperature sensing device (not shown), and finally a fourth spring contact 350 links the PCB with the second lead 334 of the second temperature sensing device.

Figure 8:
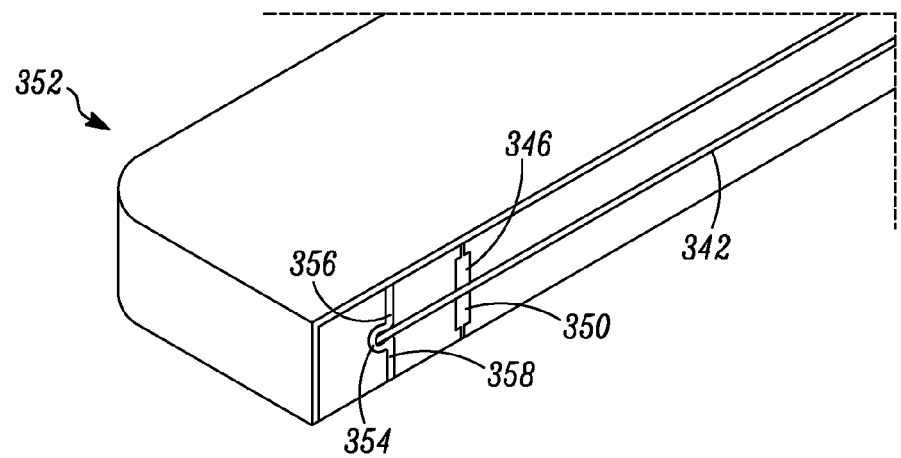

Turning to FIG. 8, an additional perspective partly cross-sectional, partly cut-away view is provided of a modified version of the mobile device 322 shown to be a mobile device 352. In this embodiment, the mobile device 352 is identical to the mobile device 322, except insofar as while the mobile device 352 continues to employ the spring contacts 346 and 350, in place of the spring contact 344 and 348 a different form of symmetrical contact formation 354 having a first contact portion 356 and a second contact portion 358 is utilized. As shown, the first and second contact portions 356, 358 are linked with one another by a middle portion that wraps around the edge of the PCB 342. In the embodiments discussed above with respect to FIGS. 1-2, and 4-8, the mobile devices shown therein have each had two temperature sensing devices. Nonetheless, in a preferred embodiment of the present invention a given mobile device can have numerous interconnected temperature sensing devices above and beyond merely two temperature sensing devices. Indeed, depending upon the embodiment, a given mobile device can have any arbitrary number of temperature sensing devices positioned on any one or more of the surfaces (and within any one or more regions along those surfaces), and those various temperature sensing devices can be interconnected in any of a variety of manners. For example, in some embodiments, the mobile device need not have only one temperature sensing device on a given front, rear, or other surface of the mobile device. More particularly in this regard, referring to FIG. 9, a front surface 360 of a mobile device 362 is shown schematically to include eight different temperature sensing devices 364 on that front surface alone. Further with respect to FIG. 9, the temperature sensing devices 364 can be embedded within a screen such as a touch screen that extends over much of (or in the case of FIG. 9) even the entire front surface 360 of the mobile device 362. More particularly, the interconnected temperature sensing devices can also, in one embodiment, be distributed on the housing skin (not within display glass) as small junctions or features exposed or minimally covered for aesthetics.

Figure 9:
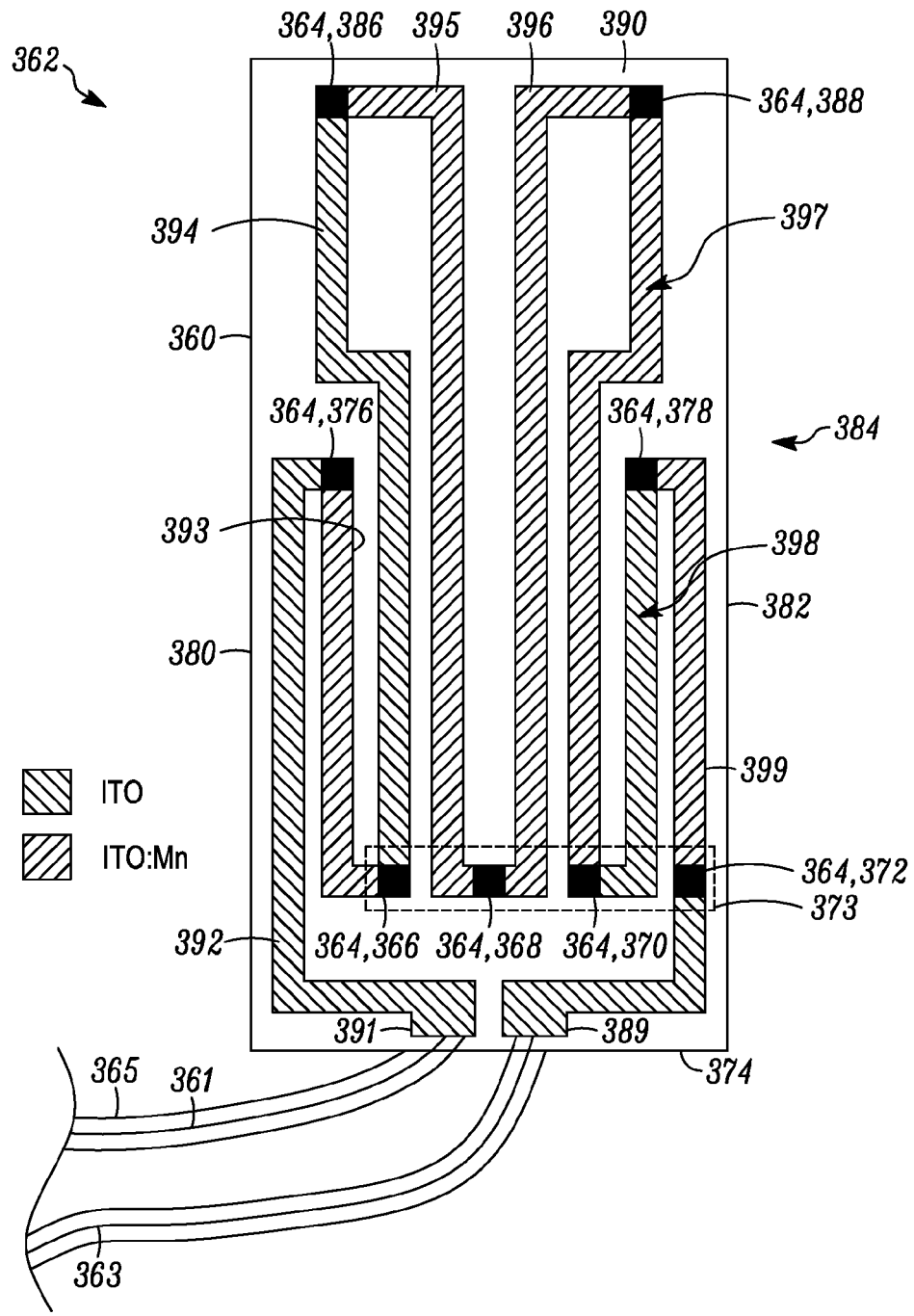
FIG. 9 is a schematic illustration of an exemplary layout of multiple temperature sensing devices as can be arranged on a mobile device in another embodiment of the present invention.

The placement of the temperature sensing devices 364 so as to be embedded within the touch screen as shown in FIG. 9 (or similar placement) is in contrast to the embodiments of FIGS. 5-8, where the temperature sensing devices 308, 310, 328 and 330 are positioned under (that is, on the interior surface of) heat conducting features of the mobile device such as the bezel 324 or the back plate 326. Because of the placement of the temperature sensing devices 364 within the screen as shown in FIG. 9, the mobile device 362 can have particularly advantageous temperature sensing performance. While conduction of temperature/heat through metallic portions such as the bezel 324 and back plate 326 can take some time (such that temperature sensing performed by the interior temperature sensing devices 308, 310, 328, 330 is slightly delayed), when the temperature sensing devices are embedded as in FIG. 9 into the front surface 360, the heat conduction no longer takes as much time and so the temperature sensing devices can have a shorter response time overall (the improvement can involve a change on the order of perhaps a reduction of a 10 second response time to a 2-3 second response time). Although the temperature sensing devices 364 are along the front surface 360, it will be understood that similarly large numbers of temperature sensing devices can be positioned along other (e.g., rear or side) surfaces of the mobile device.

As further shown in FIG. 9, the temperature sensing devices 364 are distributed in a particular manner across the front surface 360. More particularly, first, second, third and fourth ones of the temperature sensing devices 366, 368, 370, and 372, respectively, are positioned in a line, one adjacent to the next, along a bottom edge 374 of the mobile device 362, while fifth and sixth ones of the temperature sensing devices 376 and 378, respectively, are positioned proximate left and right edges 380 and 382, respectively, of the mobile device generally within a mid region 384 of the mobile device. Further, seventh and eighth ones of the temperature sensing devices 386 and 388, respectively, are positioned proximate a top edge 390 of the front surface 360, generally proximate the upper left and right corners of the mobile device.

Also, in the present embodiment, a graphite strip 373 (shown in phantom) is placed across the front surface 360 that links up the first, second, third and fourth temperature sensing devices 366, 368, 370 and 372 for the purpose of heat conduction therebetween. By virtue of the graphite strip 373, the four temperature sensing devices 366, 368, 370 and 372 are at the same or substantially the same temperature notwithstanding their somewhat different positions across the mobile device (and notwithstanding possible heat differences occurring internally within the mobile device, such as heat differences caused by the relative proximity of the different temperature sensing devices to heat-generating components such as a microprocessor within the mobile device). More particularly, by virtue of the graphite strip 373, the four temperature sensing devices 366, 368, 370 and 372 proximate the bottom edge 374 can be assumed to be at the same temperature that serves as a "common base line" with which to compare the temperatures sensed at the other temperature sensing devices 376, 378, 386, 388, This is helpful because the mobile device 362 can be assumed to have heat generating sources randomly located within it, such that the temperature profile within the mobile device 362 can also be non-uniform. The presence of the graphite strip 373 ameliorates the temperature variations occurring due to the heat generated by such internal heat generating sources, at least for the purpose of the region encompassing the four temperature sensing devices 366, 368, 370 and 372 proximate the bottom edge 374.

The specific characteristics of the graphite strip 373 can vary with the embodiment. In the present embodiment, FITC graphite available from Tyk America, Inc. of Clairton, Pa. can be used, which has a thermal conductivity of approximately 700 $W \cdot K^{-1} \cdot m^{-1}$. HTC graphite is advantageous in that it is relatively expensive, very thin (takes up little z-stack) and also available in an electrically non-conducting format. In other embodiments, other types of graphite (e.g., normal graphite) can be used. Additionally, in still other embodiments, strips of other types of thermally-conductive materials can be used as (or in place of) the graphite strip 373 to equilibrate the temperature in the planar direction between the temperature sensing devices 366, 368, 370, 372, for example, strips made of copper, silver, aluminum, or even diamond. In embodiments where an electrically conductive material such as copper is employed in place of the graphite strip 373, such material can be rendered electrically non-conductive so as to prevent electrical conduction between the different temperature sensing devices 366, 368, 370, 372 by coating the material with an electrically insulating surface/coating. Thus, a variety of other types of thermally conductive links can be used in place of the graphite strip 373 depending upon the embodiment.

The graphite strip 373 or other thermally-conductive strip linking the temperature sensing devices 366, 368, 370 and 372 need not be present in all embodiments. Further, in some alternate embodiments, one or more other arrangements of graphite strips or other thermally conductive links can be present in addition to or instead of the graphite strip 373 so as to link up other combinations of the temperature sensing devices 364 so as to maintain those temperature sensing devices at the same or substantially the same temperature. For example, in another embodiment, a graphite strip could be used to thermally link up the fifth, sixth, seventh, and eighth temperature sensing devices 376, 378, 386 and 388.

The present invention is intended to encompass a variety of embodiments in which any of a variety of different types of temperature sensing devices are employed. That said, in the present embodiments of FIGS. 1-9, the temperature sensing devices 112, 116, 308, 310, 328, 330, 364 are thermocouples, which are voltage devices with Seebeck coefficients from about 5 to about 45 (e.g., on the order of 10) micro V/deg C. The materials out of which the thermocouples are formed can vary depending upon the embodiment, and determine (at least in part) the voltages output by the thermocouples at different temperatures. Typically the thermocouples are formed by a junction of two different materials. For example, with respect to the embodiment of FIG. 4, the temperature sensing devices 112 and 116 can each be thermocouples formed by the junction of two metals, where the second lead 262 and second wire 266 are made of one metal while the first lead 258, second lead 268, first wire 260 and third wire 270 are made of a different metal. Also for example, with respect to FIG. 9, each of the temperature sensing devices 364 is a thermocouple formed by a respective junction of first and second types of materials, which in the present embodiment are Indium Tin Oxide ($InSnO_4$) ceramic material (hereinafter referred to as ITO) and Indium Tin Oxide Manganese ceramic material (hereinafter referred to as ITO:Mn).

It should be noted that, in a thermocouple-type temperature sensing device, it is the junction (that is, the point or surface interface where the two dissimilar metals meet before they part ways as two dissimilar wires/conductors) that is the temperature sensitive portion of the device, and the remainder of the device (e.g., the parting wires/conductors) merely allows for connection of the device to other hardware and does not influence temperature sensing performance. Thus, in implementing thermocouple-type temperature sensing devices, the placement of the thermocouple junction is of particular interest so that temperature is sensed at the desired location. Further, in embodiments such as those of FIGS. 5-6 where the temperature sensing devices are positioned adjacent to (underneath) overlying structures such as the logo regions 304, 306, the bezel 324, or the back plate 326, it is desirable to connect the thermocouple junction of a given temperature sensing device physically to its respective overlying structure (e.g., via welding, soldering, mechanical pressing, molding, etc). Additionally in such embodiments, the logo regions 304, 306, bezel 324, back plate 326 or other overlying structures should be configured so as to conduct/transfer heat quickly to the associated thermocouple junctions when touched (e.g., these structures should be thin and small to improve response time).

Although each of the embodiments of FIGS. 1-9 show two or more thermocouples that are connected in series, any arbitrary number of thermocouples or other temperature sensing devices can be connected serially or otherwise connected and utilized depending upon the embodiment. FIG. 9 in particular illustrates an example where the eight temperature sensing devices 364 arranged along a single surface (namely, the front surface 360) of the mobile device 362 are all connected in one overall series connection. As illustrated particularly by FIG. 9, each of the temperature sensing devices 364 is a thermocouple formed by a respective junction of an ITO lead and an ITO:Mn lead, and these leads are all interconnected in a manner by which all of the temperature sensing devices 364 are connected in series between a first terminal 391 and a second terminal 389. Further as shown, the first and second terminals 391 and 389 respectively are coupled to respective copper wires 361, 363 that are surrounded by a flexible plastic sheathe 365 so as to form a two-wire flex link. Although shown in cut-away, it will be understood that the copper wires 361, 363 and sheathe 365 extend away from the terminals 391, 389 and allow those terminals to be coupled to other components (e.g., to an operational amplifier such as the operational amplifier 256 of FIG. 4).

More particularly as shown, the first terminal 391 is linked to the fifth temperature sensing device 376 by way of a first ITO lead 392, and that temperature sensing device in turn is linked to the first temperature sensing device 366 by way of a first ITO:Mn lead 393. The lead 393 extends up to the second temperature sensing device 366, and then a second ITO lead 394 extends from the first temperature sensing device to the seventh temperature sensing device 386. A second ITO:Mn lead 395 links the seventh temperature sensing device 386 to the second temperature sensing device 368. A third ITO lead 396 in turn links the second temperature sensing device 368 to the eighth temperature sensing device 388, which then is connected to the third temperature sensing device 370 by way of a third ITO:Mn lead 397, and the third temperature sensing device in turn is connected to the sixth temperature sensing device 378 by way of a fourth ITO lead 398. Finally the sixth temperature sensing device 378 is connected to the fourth temperature sensing device 372 by way of a fourth ITO:Mn lead 399. The fourth temperature sensing device 372 is formed by the intersection of the lead 399 and the second terminal 389, which is also an ITO lead.

In implementing thermocouple-type temperature sensing devices, the manner in which the device is interconnected with other components (and the correspondent polarity of the device relative to other components) often is of significance in implementing the device, particularly where multiple temperature sensing devices of this type are connected in series. For example, in an embodiment in which there are two thermocouple-type temperature sensing devices that are interconnected as shown in FIG. 4, where it is intended that one of the thermocouple devices is on one side of the phone and the other thermocouple device is on the other side of the phone, it is typical that the respective polarities of the temperature sensing devices/thermocouples will be oppositely-orientated so as to allow for differential temperature sensing. Given such an orientation, assuming that the two temperature sensing devices each experience the same temperature, a voltage increase (or decrease) generated by one of the temperature sensing devices due to the particular temperature will tend to be offset by a corresponding voltage increase (or decrease) generated by the other of the temperature sensing devices. Alternatively, assuming that there is a temperature differential between the two temperature sensing devices such that the two devices output different voltages, the difference between those voltages will be experienced by the operational amplifier 256 across its input terminals.

By contrast with the embodiment of FIG. 4, the mobile device 362 of FIG. 9 is an exemplary device in which multiple temperature sensing devices are distributed at three different general regions along a single surface (namely, the front surface 360) of the mobile device. Notwithstanding the fact that in this embodiment more than two temperature sensing devices are employed and coupled together in series, it is still possible to obtain meaningful temperature information because of the particular manner in which the temperature sensing devices are interconnected. As will be noticed from FIG. 9, each of the temperature sensing devices 366, 368, 370 and 372 that are located proximate the bottom edge 374 of the mobile device 362 are formed by the intersection of a respective one of the ITO:Mn leads extending away from the respective temperature sensing device generally upwardly and a respective ITO lead that extends away from each of those respective temperature sensing devices also generally upwardly but to the right of the respective ITO lead for that temperature sensing device (except in the case of the fourth temperature sensing device 372, from which the ITO lead extends downwardly). By comparison, each of the fifth and sixth temperature sensing devices 376, 378 towards the midregion 384 of the mobile device 362 is connected to a respective one of the ITO leads extending away from that temperature sensing device generally downwardly and also to one of the ITO:Mn leads extending generally downwardly and to the right of the respective ITO lead for that device (it is the same for the seventh and eighth temperature sensing devices 386, 388 near the top edge 390 of the mobile device).

Given this type of configuration, the first, second, third, and fourth temperature sensing devices 366, 368, 370, and 372 all share a first polarity, while the fifth, sixth, seventh, and eighth temperature sensing devices 376, 378, 386 and 388 all share a second polarity that is opposite the first polarity. Consequently, should a high temperature be experienced generally along the bottom region of the mobile device 362 proximate the sensing devices 366, 368, 370, 372, the voltages generated by those respective temperature sensing devices all tend to increase (or decrease) generally uniformly and tend to be additive, and the resulting output voltage experienced at the terminals 391, 389 will be the sum of the contributions from those four sensing devices. Such reinforcing behavior of the sensors 366, 368, 370, 372 is particularly facilitated by the presence of the graphite strip 373. Likewise, if a particular temperature is experienced along the top edge 390 or the midregion 384, then the pairs of temperature sensing devices 376, 378, and 386, 388 at those respective locations will tend to generate voltages that are additive and reinforcing of one another, and the resulting output voltage experienced at the terminals 391, 389 will be the sum of the contributions of any one or more of those temperature sensing devices.

It should be noted that the configuration of FIG. 9 is reflective of certain assumptions regarding the operation of the mobile device 362. In particular, the arrangement of the temperature sensing devices 364 presumes that it is unlikely that a user will touch (that is, apply heat proximate to) both one or more of the temperature sensing devices 366, 368, 370, 372 near the bottom edge 374 while at the same time touch one or more of the temperature sensing devices 376, 378, 386, 388 at the midregion 384 or near the top edge 390. Rather, typically a user will only touch one or more of the sensing devices near the bottom edge 374 or touch one or more of the other sensing devices 376, 378, 386, 388, but not both. Such an assumption is especially plausible if the placement of some of the temperature sensing devices is at or proximate to a location on the mobile device 362 at which heat is less likely to be applied (e.g., near a microphone on the mobile device). Given this assumption, it is unlikely that the voltages generated by the temperature sensing devices 366, 368, 370, 372 will be cancelled out by the voltages generated by the temperature sensing devices 376, 378, 386, 388 due to touching of the mobile device by a user. The configuration of FIG. 9 additionally illustrates how, in some embodiments of the present invention, various advantages can be achieved by utilizing multiple temperature sensing devices provided within a given region on a given surface of the mobile device rather than utilizing only a single temperature sensing device to sense a temperature at a given region of the mobile device (as is presumed in the embodiment of FIG. 4, for example). In particular, FIG. 9 shows that multiple temperature sensing devices such as the devices 366, 368, 370, 372 can be collectively employed, effectively as a single "group sensor", so as to sense the temperature within a given region of the mobile device 362, that is, proximate the bottom edge 374 of the mobile device. Likewise, FIG. 9 shows that the multiple temperature sensing devices 376, 378, 386, 386 can be collectively employed, again effectively as a group sensor (or as multiple group sensors each made up of two temperature sensing devices), to sense the temperature(s) at either one or both of the midregion 384 and proximate the top edge 390 of the mobile device 362. Insofar as these temperature sensing devices operate as group sensors, temperature changes occurring nearing any of the sensing devices of the group sensor arc sensed quickly. This is in contrast to embodiments where only a single temperature sensing device is present within a given region, such that temperature changes must be communicated to the location of that particular temperature sensing device before those changes are sensed.

Additionally, FIG. 9 illustrates how in some operational conditions it is possible for a variety of different temperature conditions within a variety of different regions of the mobile device can be sensed simply by series-connecting any arbitrary number of temperature sensing devices and using the simple hardware shown in (or hardware similar to that shown in) FIG. 4. In particular, it will be understood from FIG. 9 that temperature changes experienced proximate the bottom edge 374 of the mobile device 362 will have twice the effect as temperature changes experienced merely within the midregion 284 of the mobile device, since four of the temperature sensing devices 364 arc located near the bottom edge while only two of the temperature sensing devices 364 are located near the midregion 384.

Similarly, in other embodiments, by providing different numbers of temperature sensing devices at different regions of interest along the outer surfaces of the mobile device, the overall voltage signals produced by the series-connection of those temperature sensing devices can be interpreted to determine temperature changes occurring at (and temperature differentials occurring between) those numerous different regions of the mobile device. For example, assuming a hypothetical arrangement in which four temperature sensing devices were located in a first region (e.g., a 5 mm circle) and a fifth temperature sensing device was located in a second region (e.g., another 5 mm circle), and assuming that all of the temperature sensing devices were connected in series but the fifth temperature sensing device was oppositely connected in terms of its polarity relative to the other four, then temperature changes occurring at the first region would have four times the impact upon the overall output voltage of the five series-connected temperature sensing devices than temperature changes occurring in the second region, and thus the overall output voltage could be interpreted accordingly.

Numerous other embodiments with numerous other types of temperature sensing devices and configurations thereof are additionally intended to be encompassed by the present invention. For example, sets of multiple temperature sensing devices positioned on different sides (e.g., the front and rear sides) of a mobile device can all be connected in series with one another. Also for example, where a set of temperature sensing devices are intended to operate as a "group sensor" associated with a particular region of a mobile device, the proximity of those temperature sensing devices with respect to one another can vary depending upon the embodiment. Further for example, in some embodiments, one or more of the temperature sensing devices can serve as a touch sensor (e.g., as the side touch sensor 119). For example, by placing the temperature sensing devices along sides (e.g., side edges) of the mobile device, it is then possible to determine which side of the mobile device is warmer and then conclude that the warmer side is the side the user is holding.

Further, in some embodiments, sensed temperature information (including sensed temperature information available from groups of sensors) can be interpreted as an indication of keypad entries or other user input signals or instructions. In one embodiment of this type, a first set of temperature sensing devices (e.g., 20 devices) can be placed within a first region and serve as a first "button" while a second set of temperature sensing devices different in number (e.g., 1 device) can be placed in a second region and serve as a second "button". Assuming all of the temperature sensing devices of the two sets are coupled in series, the mobile device can then detect whether the first region or the second region is touched based upon whether a voltage signal that is detected is large (e.g., from the 20 devices) due to heating of the first region from the user's finger, or small (e.g., from the 1 device) due to heating of the second region from the user's finger.

Further, notwithstanding that in some circumstances it is desirable to operate multiple temperature sensing devices within a given region as a group sensor as discussed above, in some circumstances embodiments such as those of FIGS. 5 and 6 in which a single temperature sensing device is connected to another overlying structure such as a logo region, bezel or back plate can be desirable. Such embodiments involving overlying structures in particular allow for heat to be conducted to (or away from) the temperature sensing device from (or to) a variety of locations along the exterior surface of the mobile device as determined by the extent of the overlying structure. In particular, the use of an overlying structure in connection with a temperature sensing device allows for that temperature sensing-device to potentially be influenced by a user's touching of any portion of that overlying structure. Further, while the above description has concentrated on implementations of temperature sensing devices that either are attached to an overlying structure such as the logo regions, bezel and back plate discussed above or embedded within a touch screen (or similar plastic or glass screen portion) of a mobile device, in other embodiments temperature sensing devices can also be placed immediately on the outer surface of a mobile device. In some such embodiments, the temperature sensing devices are implemented so that thermocouple junctions are situated immediately along the exterior of the mobile device (that is, the junctions just pierce out of the mobile device as "dots"). Such embodiments can provide even more rapid response times, in terms of how fast temperature changes are sensed, than embodiments where the thermocouple junctions are embedded within a touch screen (much less where the junctions are beneath overlying structures). In general, for quickest sensing/response times, it is desirable to minimize the distance between the thermocouple junction and the heat source.

Figure 10:
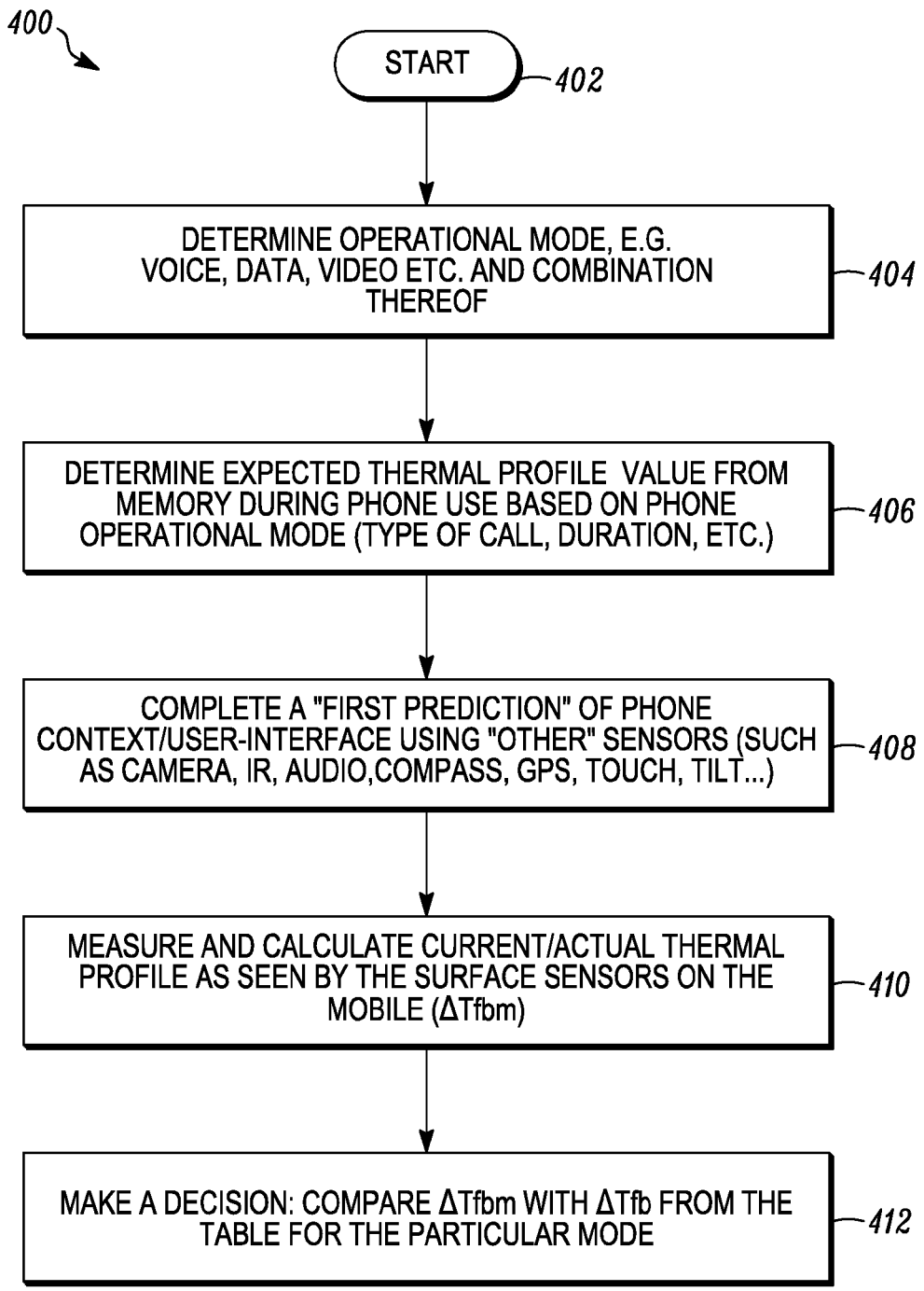
FIG. 10 is a flow chart showing exemplary steps of operation of the mobile device of FIGS. 1-3 in determining an operational context of the mobile device based at least in part upon information from the temperature sensing componentry.
Figure 14:
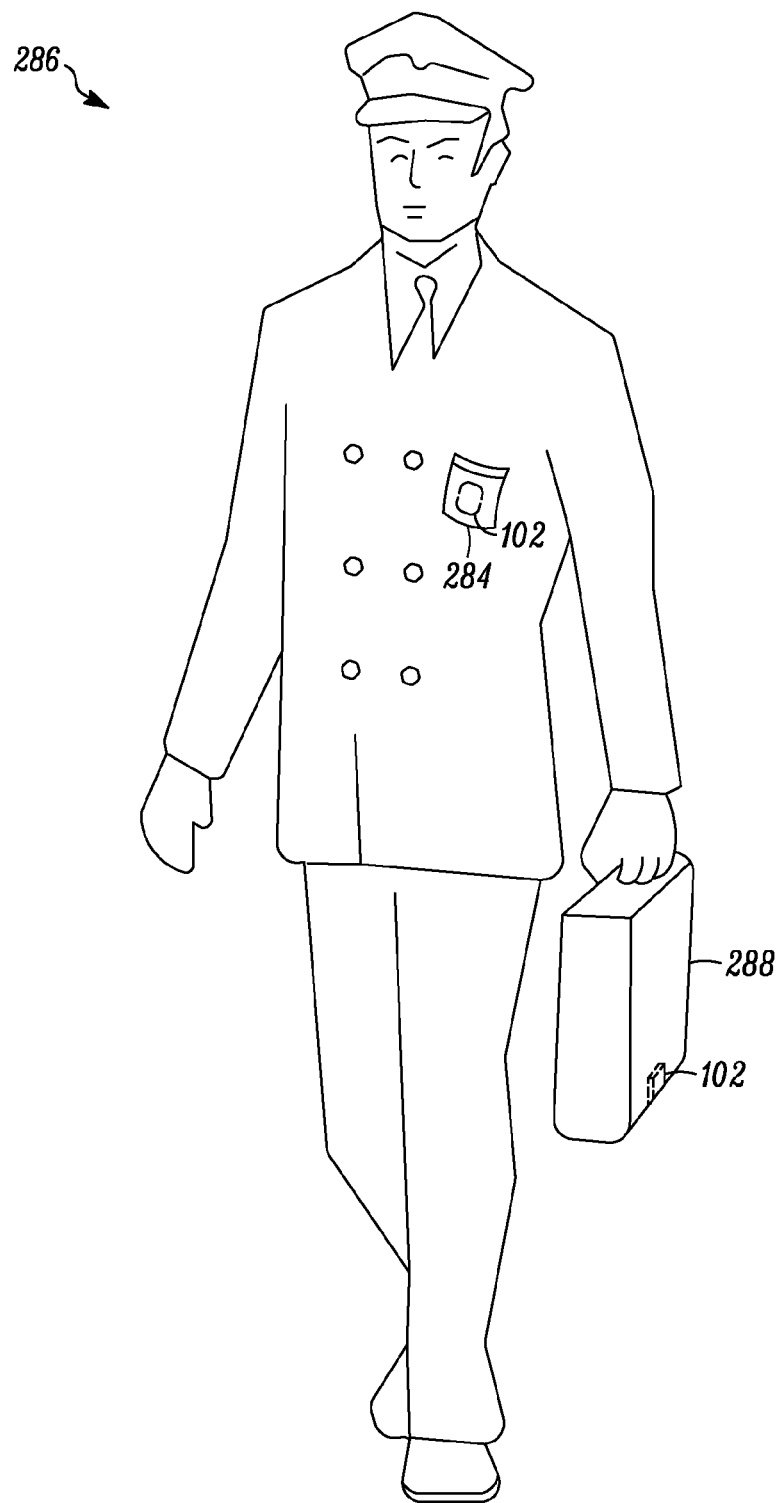
FIG. 14 is a schematic illustration of different types of mobile device operational contexts that can be determined by the mobile device acting in accordance with processes such as those shown in FIGS. 10, 11 and 13.

Turning to FIG. 10, a flow chart 400 shows exemplary steps of a process of operation of a mobile device such as the mobile device 102, in which the mobile device utilizes differential temperature information obtained by way of temperature sensing componentry such as the first and second temperature sensing devices 112, 116 in order to make determination(s) regarding an operational context of the mobile device and/or decision(s) regarding further operation(s) of the mobile device in view of the determined operational context. Although assumed for the present discussion to be performed by the mobile device 102, the same or similar process can also be implemented on other mobile devices such as the other mobile devices discussed above. As shown, upon commencing the process at a step 402, at a step 404 the mobile device 102 first determines its own operational mode. For example, the mobile device 102 can depending upon the circumstances be operating in a voice mode (that is, a mode in which the mobile device is transmitting and/or receiving voice information), a data mode (where data is being transmitted and/or received), a video mode (where video information is being transmitted and/or received), and/or a combination of two or more of these modes. It should be understood that, for purposes of the present description, an operational "mode" is different from an operational "context" (or "condition"). While a "mode" refers to a manner of operation of the mobile device 102, a "context" (or "condition") refers to the physical position of the mobile device in relation to one or more other structures (or being physically apart from one or more other structures), such as being within the pocket 284 (e.g., a shirt pocket as shown, or a pants pocket, or a jacket pocket) or purse 288 as shown in FIG. 14, being on a table or desk top or other substantially rigid, substantially horizontal surface, or being suspended in the air.

Additionally, at a step 406 the mobile device 102 determines its expected or predicted thermal profile value ($\Delta$Tfb) in view of the particular operational mode of the mobile device 102 as determined in the step 404, as well as in view of a presumed operational context. The expected thermal profile value is the temperature differential that would be expected to be measured by way of the temperature sensing devices 112, 116 given a particular operational mode and a particular operational context of the mobile device 102 (the abbreviation $\Delta$Tfb in particular refers to the temperature differential between the front side temperature sensing device 112 and the back side temperature sensing device 116). In the present embodiment, the mobile device 102 determines its expected thermal profile value by consulting information available from a look-up table 420 stored in the memory portion 206 of the mobile device 102. That is, by using the information obtained by the mobile device 102 in the step 404 regarding its current operational mode, and assuming a particular operational context, the mobile device is able to consult the look-up table 420 during the step 406 to obtain its expected thermal profile value in view of that current operational mode information and operational context information.

Figure 11:
FIG. 11 is an exemplary look-up table that can be stored on a memory device of the mobile device of FIGS. 1-3 and consulted during performing of the process represented by the flow chart of FIG. 10.

Referring additionally to FIG. 11, the look-up table 420 can contain a variety of expected thermal profile values corresponding to a variety of operational modes and/or contexts of a mobile device. The look-up table 420 includes both a first column 414 in which are listed a variety of possibilities of operational modes (e.g., voice, data, sleep) of the mobile device 102, as well as a second column 416 in which are listed a variety of possibilities of contexts/conditions of the mobile device (again for example, the mobile device can be suspended within quiescent air of a particular temperature, or possibly in some other environment such as a pocket or purse). A third column 418 identifies the expected thermal profile value corresponding to each particular pair of possibilities from the first and second columns 414, 416. The expected thermal profile values stored in the look-up table 420 typically are obtained by way of testing done upon the mobile device 102 by the manufacturer (e.g., in the factory) prior to the sale of the mobile device to a consumer, and this stored information is then provided as part of the mobile device when it is sold to the consumer. Often, the same look-up table can be used for all mobile devices of the same model/type (which are assumed to be identical). In such cases, the manufacturer measurements are preferably be done on a statistical sample of mobile devices of a particular model/type and then considered standard across all others. "In quiescent air" can be understood to be a test condition where the mobile device is suspended mid-air in a room having air that is at rest and at a particular assumed temperature.

In the present embodiment, the expected thermal profile value is particularly determined from the look-up table 420 based upon the present operational mode status of the mobile device 102. Nevertheless, in other embodiments, the expected thermal profile value can be based upon information regarding the past operational mode status of the mobile device 102 in addition to, or instead of, the current operational mode status. Further, in some embodiments, the expected thermal profile value can be a value that is periodically-determined or tracked by the mobile device 102 during its operation over time. Also, in some embodiments, the expected thermal profile value given certain operational circumstances of the mobile device can further be adjusted to take into account past operational circumstances, such as the amount of recent operational activity of the mobile device 102, etc.

Returning to FIG. 10, upon determining the expected thermal profile value at the step 406, the process then advances to a step 408. At this step, the mobile device 102 takes into account signal(s) from one or more of the other sensors 231 that are indicative of particular mobile device operational context information that is of interest and, based upon such signal(s), makes a preliminary or "first prediction" regarding the true operational context of the mobile device that is of particular interest, e.g., whether the mobile device is within the operator's pocket 284, within the purse 288, etc. For example, signals from one or more of a camera, infrared sensor, audio sensor, compass, global positioning system sensor, touch sensor, tilt sensor, etc. can be considered in making this prediction.

In the present embodiment, signals from the side touch sensor 119 can be of particular value. To the extent that signals provided from the side touch sensor 119 indicate that the sensor is being touched, those signals can be interpreted as an indication that the mobile device 102 is within an operator's hand and consequently not within the operator's pocket or purse.

Although in the present embodiment the mobile device 102 particularly takes into account information from its own sensors, in other embodiments it is also possible for the mobile device to take into account information from other (e.g., remote) sources as well. For example, in some alternate embodiments, the mobile device can determine its own position using location information determined by way of GPS (or other devices or methods) and then based upon this information interrogate a data source external to the mobile device (e.g., by way of a network connection, such as one available via the wireless transceivers 202) to obtain temperature, humidity, other weather-related information (e.g., whether the weather will be sunny or cloudy) or other remote sensor information about the general region in which the mobile device is presently located. The external data source can be any of a variety of data sources including, for example, web-accessible databases (e.g., www.weatherchannel.com), other external databases, or external sensors. Data obtained in such a manner can then be used by the mobile device to modify the prediction values stored in the look-up table 420 (particularly in the column 418). For example, if the humidity exceeds a threshold, the data in the column 418 can be modified to account for the high humidity.

Upon completion of the step 408, at a step 410 the mobile device 102 then determines a current, actual thermal profile value ($\Delta Tfbm$) as measured by the first and second temperature sensing devices 112, 116 (or other temperature sensing componentry depending upon the embodiment). That is, the mobile device 102 takes the temperature measurements provided by the first and second temperature sensing devices 112, 116 and determines the temperature differential there between to be the actual thermal profile value. Using this information then, finally at a step 412, the mobile device 102 compares the actual thermal profile value ($\Delta Tfbm$) with the expected thermal profile value (AM) obtained from the look-up table 420 in step 406 given the particular operating mode of the mobile device 102 and, based upon that comparison as well as the first prediction from the context information obtained at the step 408, determines an operational context of the mobile device. Once the operational context is determined, then the mobile device 102 can further take one or more particular actions suitable in view of that operational context as described in further detail.

Figure 12:
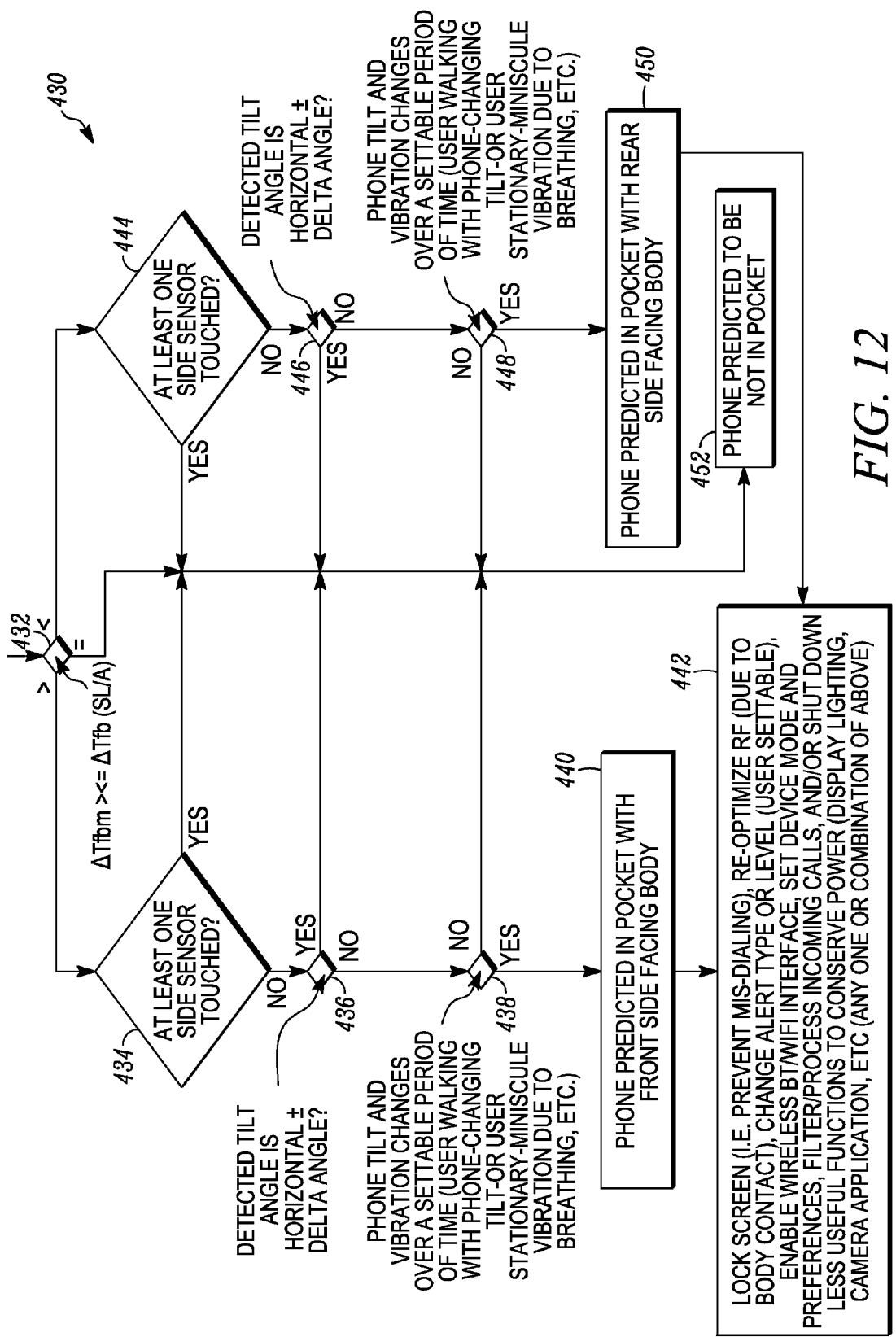
FIGS. 12 and 13 are additional flow charts showing further exemplary steps of operation of the mobile device of FIGS. 1-3 in determining operational context of the mobile device based at least in part upon information from the temperature sensing componentry.
Figure 13:
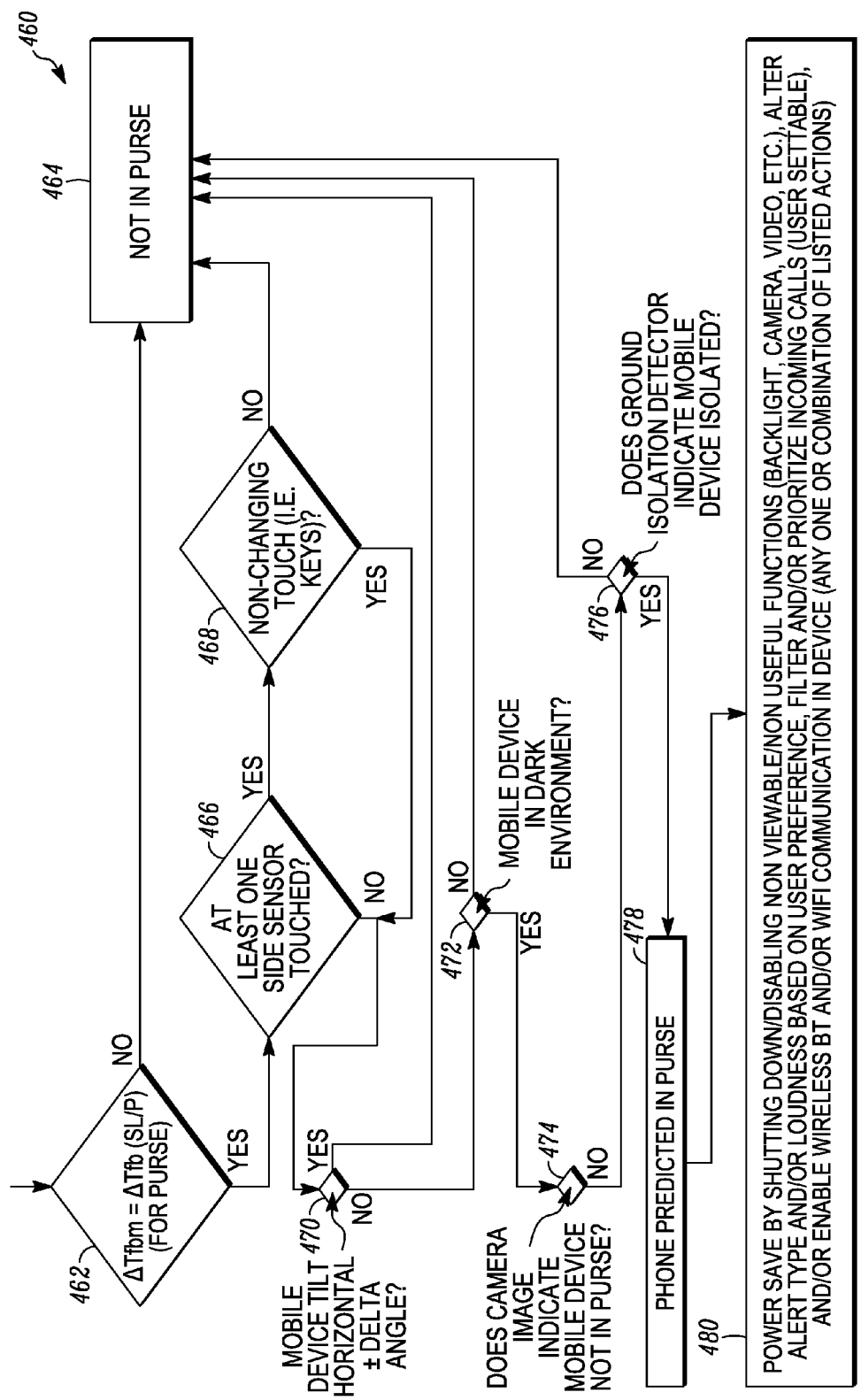

Turning to FIGS. 12 and 13, exemplary flow chart substeps corresponding to the aforementioned step 412 relating to the determining of the operational context of the mobile device 102 are shown. FIG. 12 particularly shows exemplary flow chart substeps 430 in which the mobile device 102 determines that the operational context of the mobile device is or is not within a pocket (such as the pocket 284 of FIG. 14) and, if within a pocket, a directional orientation of the mobile device within the pocket. Further, FIG. 12 shows particular actions that the mobile device 102 can take upon determining that the mobile device is within a pocket. By comparison, FIG. 13 particularly shows exemplary flow chart substeps 460 in which the mobile device 102 determines that the operational context of the mobile device is or is not within a purse, as well as actions that can be taken by the mobile device upon determining that it is within a purse.

Referring more particularly to FIG. 12, at a step 432 the mobile device 102 compares the measured thermal profile value $\Delta Tfbm$ with a particular one of the expected thermal profile values $\Delta Tfb$. In this example, the expected thermal profile value is $\Delta Tfb/a$, that is, a value from the look-up table 420 that corresponds to a presumed operational context of the mobile device 102 within quiescent air of a particular assumed temperature. As indicated, depending upon whether the measured thermal profile value $\Delta Tfbm$ is greater than, less than, or equal to the expected thermal profile value $\Delta Tfb/a$, the process advances to different steps. In particular, if the measured thermal profile value is greater than the expected thermal profile value, then the mobile device 102 proceeds to a step 434 at which the mobile device further determines whether the side touch sensor 119 has been touched. If the side touch sensor 119 has been touched, then the mobile device 102 proceeds to a step 452, at which it is concluded that the mobile device is not within a pocket.

However, if the side touch sensor 119 has not been touched, then the mobile device 102 proceeds to a step 436, at which the mobile device 102 determines whether it is tilted so as to be at an orientation other than horizontal (it being understood that horizontal orientation most likely indicates a table surface) plus or minus some minor (delta) angle (e.g., +/−0.5 degrees off of horizontal). This determination can be made using signal(s) received from one or more of the other sensor(s) 231 such as an accelerometer, gravitometer, or tilt sensor of the mobile device 102 that are indicative of the physical orientation of the mobile device. Again, if at the step 436 it is determined that the detected tilt angle is horizontal plus or minus the delta angle (that is, approximately horizontal), then the process advances to the step 452 at which the mobile device is predicted to not be in a pocket. This prediction is made because, in the event the mobile device is approximately horizontal, it is highly unlikely (although not impossible) that the mobile device is in a pocket. Rather, in such circumstance, it is likely that the mobile device 102 is on a table or desk top.

Alternatively, if at the step 436 it is determined that the detected tilt angle is other than horizontal plus or minus the delta angle (that is, not approximately horizontal), then the process advances to a step 438, at which changes experienced by the mobile device 102 in terms of vibration and positioning are considered. More particularly, if at the step 438 the mobile device 102 by way of the other sensors 231 (again, for example, an accelerometer, gravitometer, tilt sensor, or vibration sensor) detects either that the mobile device is experiencing minor vibration or acceleration (e.g., due to vibration/ breathing while the user is stationary) or that the mobile device is experiencing significant tilting or other movements including movements that are essentially large-scale vibrations (e.g., changing tilt/orientation that occurs while the user is walking) over a period of time (typically, settable/resettable), the process advances to a step 440 at which it is predicted that the mobile device is within an operator's pocket. Otherwise, lacking detectable vibrations, accelerations, tilting, movement or other positioning changes (small or otherwise) over a given predetermined time period, then the process concludes with the step 452 at which the phone is predicted to not be in an operator's pocket.

It should be noted that the above-described predictions made as a result of the step 438 are reasonable since, typically, an operator who is a living human being will move a certain amount within a given period of time (either with large scale movements such as those accompanying walking or at least small scale movements consistent with rocking or breathing). Thus, a lack of a certain amount of movement and vibration is a strong suggestion that the mobile device 102 is not within a pocket of an operator, but instead is consistent with the mobile device resting on a fixed surface such as a table top. It should further be noted that, to the extent certain types of vibration can still be present even when a mobile device is resting on a table top (e.g., vibration associated with the operation of an air conditioner within a room), in some further embodiments it is additionally desirable to consider whether small vibrations experienced by the mobile device, even though present, are still not indicative of the mobile device being within an operator's pocket. For example, small vibrations that are repetitive and ongoing (e.g., those due to an air conditioner as mentioned above) can in some circumstances be discounted as far as being indicative that the mobile device is within an operator pocket.

In the present circumstance, as noted above, the measured thermal profile value is greater than the expected thermal profile value. Among other things, this information can be interpreted as an indication that temperature at the first temperature sensing device 112 along the front side 114 of the mobile device 102 is higher than the temperature at the second temperature sensing device 116 along the rear side 118 of the mobile device. Thus, upon reaching the step 440 and determining that the mobile device 102 is within a pocket of an operator, and assuming that the pocket is in proximity to the operator's body, it can typically be assumed that the higher temperature front side of the mobile device is the side of the mobile device that is closer to the operator's body. Thus, at the step 440, it is not only predicted that the mobile device 102 is in an operator pocket, but also that the mobile device is positioned within the pocket so that the front side 114 of the mobile device is facing the operator's body.

While a determination that the measured thermal profile value is greater than the expected thermal profile value at the step 432 results in the subsequent performance of step 434 and can ultimately result in a prediction at the step 440 that the front side 114 of the mobile device 102 is facing the operator's body, as shown the mobile device at the step 432 also can determine that the measured thermal profile is less than or equal to the expected thermal profile value. Assuming that the two thermal profiles are determined to be equal, then the process advances immediately from the step 432 to the step 452, at which the mobile device is predicted to not be in an operator pocket. This is appropriate since, in almost all circumstances in which the mobile device 102 is in an operator pocket, there will be experienced across the mobile device a temperature differential corresponding to the relative distances of the sensing devices relative to the operator's body.

Alternatively, if at the step 432 it is determined that the measured thermal profile value is less than the expected thermal profile, then the mobile device 102 performs one or more of additional steps 444, 446, 448 and 450 that are identical to the steps 434, 436, 438 and 440, respectively, except insofar as at the step 450 it is predicted that the mobile device is in an operator pocket and positioned such that the rear side 118 is facing the operator's body. That is, if at a step 444 it is determined by the mobile device 102 that the side touch sensor 119 has been touched, then the mobile device proceeds to the step 452 while, if not, the mobile device advances to the step 446. Also, if at the step 446 it is determined by the mobile device 102 that the mobile device is approximately horizontal, then the mobile device proceeds to the step 452 while, if not, the mobile device advances to the step 448. Further, if at the step 448 it is determined by the mobile device 102 that insufficient tilt and vibration changes have been experienced over a preset period of time, then again the step 452 is performed but, if sufficient tilt and vibration changes have been experienced, then the mobile device at the step 450 determines that it is within a pocket with its rear side closer to the body of the operator.

Once the mobile device 102 has determined itself that it is frontward facing within an operator pocket at the step 440, or that it is rearward facing within an operator pocket at the step 450, then in either case the process advances to a step 442 at which the mobile device then takes one or more actions in response thereto. The particular action or actions that are taken can vary depending upon the embodiment or the circumstance and, in some embodiments, no action(s) need be taken (or no action(s) need be taken right away). As shown, in the present embodiment, the one or more action(s) that can be taken by the mobile device 102 can include, for example, locking of the screen and/or certain of the input devices 210 of the mobile device (e.g., to prevent mis-dialing). Also, for example, the mobile device 102 can reconfigure its operation so that radio frequency (RF) signals are better received and/or transmitted from the mobile device (among other things, in this regard, the antenna operation of the mobile device can be adjusted so that signals are directed away from the body of the operator). Further for example, one or more types of alert types or levels (including user settable alert types/levels) can be modified to reflect the presence of the mobile device 102 in an operator pocket. For example, the mobile device 102 can be automatically set to a vibrate alert type since such vibration might easily be felt by an operator while the mobile device was in the operator's pocket.

Additionally for example, upon determining its presence in an operator pocket, the mobile device 102 also can enable or disable one or more particular wireless (e.g., Bluetooth or WiFi) interfaces, set or reset the operation mode of the mobile device (e.g., from data mode to voice mode), set or reset one or more operator preferences, and/or adjust the manner in which the mobile device filters and/or processes incoming calls. Finally, also for example, the mobile device 102 can take one or more action(s) to conserve power, particularly, action(s) that shut down or place into a hibernation state certain function(s) that typically are not required or desired when the mobile device is within a pocket. Such functions can include, further for example, shutting down display lighting functions, camera applications, etc. Again, depending upon the embodiment, any one or more of the above-identified actions can be taken by the mobile device 102 upon the process reaching the step 442. The above description is not intended to be exhaustive of all possible action(s) that can potentially be taken, but rather is merely intended to be representative of some of the variety of action(s) that potentially can be taken in view of the mobile device's determination that it is within an operator pocket.

Turning to FIG. 13, the flow chart substeps 460 can be performed instead of the flow chart substeps 430 of FIG. 12 or, alternatively, subsequent to the flow chart substeps 430 particularly after the step 452 is reached. As shown, the flow chart substeps 460 begin with a step (substep) 462 at which the mobile device 102 compares the measured thermal profile value $\Delta Tfbm$ with a particular one of the expected thermal profile values $\Delta Tfb$ (sl/p) corresponding to operation within a purse. If the two values are not equal, in this example, the mobile device 102 immediately proceeds to a step 464 at which the mobile device concludes that it is not within a purse. However, if the measured and expected thermal profile values are equal, then the process advances to a step 466, at which it is determined whether at least one side touch sensor such as the side touch sensor 119 is being touched. If signal(s) from such touch sensor(s) indicate touching, then at a step 468 the mobile device 102 further determines whether the sensed touching is non-changing touching that could correspond to touching signals arising from the resting of the mobile device 102 in a particular manner within a purse. Such touching could also potentially occur due to pressure placed upon keys on the mobile device 102. If the sensed touching is not non-changing, then the process again proceeds to the step 464 and it is determined that the mobile device 102 is not within a purse.

However, if at the step 468 it is determined that the sensed touching is non-changing touching, or if at the step 466 non-touching is determined, then in either case the process advances to a step 470. At the step 470, the mobile device 102 determines whether the mobile device is tilted horizontal plus or minus a small (delta degrees) angle such that it is likely the mobile device is located on a table top or desk top. As discussed above, such a determination can be arrived at using signals from one or more of the other sensors 231 such as an accelerometer, gravitometer or tilt sensor. If the orientation of the mobile device 102 is approximately-horizontal, again the mobile device concludes at the step 464 that it is not within a purse. However, if the orientation of the mobile device 102 is not approximately horizontal, then the process advances from the step 470 to a step 472, at which the mobile device 102 next determines whether it is in a dark environment, as can be determined by way of another of the other sensors 231 such as a light sensor. For purposes of the step 472, the level of darkness indicative of a dark environment can be set to varying levels depending upon the embodiment or circumstances. If the environment detected by the mobile device is determined not to be dark, then the mobile device 102 again proceeds to the step 464 and concludes that it is not in a purse. However, if the environment is determined to be dark, then the process advances to a step 474.

In the present embodiment, at the step 474, the mobile device 102 receives image information provided by a camera (another of the other sensors 231) of the mobile device 102 regarding an image perceived by the camera (e.g., a snapshot of the surrounding environment). The processor 204 processes the image information and makes a determination of whether the image information is or is not indicative of the mobile device 102 being within a purse. If the image information, as processed, indicates that the mobile device 102 is not in a purse (for example, because the image information appears to represent a human face or another recognizable item), then the process concludes at the step 464 that the mobile device 102 is not in a purse. Alternatively, if the image information as processed indicates that the mobile device 102 is within a purse (or is not inconsistent with the mobile device being within a purse), then the process advances to a step 476.

At the step 476, in turn, the mobile device 102 is provided with information from an electrical (or ground) isolation detector (another of the other sensors 231) of the mobile device and, at that step, further determines based upon the information from that sensor whether the mobile device appears to be isolated from earth ground (and/or isolated from an operator). While sensed isolation would tend to indicate that the mobile device is within (e.g., "floating within") a non-conductive purse, an absence of isolation would tend to indicate that mobile device is being held by an operator in the operator's hand or otherwise not in a purse. Consequently, if isolation is not sensed, then the process again concludes at the step 464 that the mobile device 102 is not within a purse, but if isolation is sensed, then the process advances further to a step 478, at which the mobile device 102 predicts that it is indeed within a purse.

Once the mobile device 102 at the step 478 has determined (or at least predicted) that it is within a purse, as with respect to FIG. 12, the mobile device can take one or more of a variety of actions that are appropriate given the mobile device's context. More particularly, subsequent to the step 478, at a step 480, the mobile device 102 can switch its manner of operation to a "Power Save" manner of operation by shutting down and/or disabling non-viewable functions and/or other functions that are non-useful assuming that the mobile device is within a purse. Such functions can include, for example, backlighting, camera, video display, and other functions. Also, at the step 480, the mobile device 102 can adjust its type of alert and/or the loudness of the alert to reflect the positioning of the mobile device within a purse. Such adjustments can be made to reflect user preferences, based upon one or more filtering mechanisms, and/or to prioritize incoming user calls, and the manner of such adjustments can be determined based upon, among other things, inputs previously-entered by an operator. Additionally at the step 480, the mobile device can also enable (or disable) wireless Bluetooth and/or WiFi communication.

It should be evident from the above discussion that detection of operational context by the mobile device 102 allows the mobile device to adjust its operational performance in view of the detected context so as to achieve enhanced or modified performance in a variety of manners, including enhanced or modified performance in terms of the user interfacing that is provided, the power usage of the mobile device, the operational mode(s) (including mode(s) of wireless communications) of the mobile device, and/or in other manners.

Additionally, it should be evident from the above discussion that, in at least some embodiments, it is particularly useful for the mobile device 102 to consider a variety of types of information from a variety of different embedded sensing technologies that, when considered together, allows for the unique detection of various operational contexts of the mobile device (and the structure(s) with which the mobile device is in contact or interfacing). Although the present invention is intended to encompass numerous different arrangements, as discussed above in many embodiments of the present invention the mobile device 102 takes into account sensed differential temperature information as being of primary interest, where the sensed differential temperature information can include information from a single pair of temperature sensors (representing the temperature differential therebetween) or possibly multiple pairs of temperature sensors (it also being understood that any given sensor can be part of more than one "pair" of temperature sensors). Notwithstanding the significance of sensed differential temperature information, in many embodiments of the present invention, the mobile device 102 takes into account both differential temperature information as well as one or more other types of sensor information and device mode and settings.

The use of multiple types of different sensory information including differential temperature information in determining whether the mobile device 102 is in a pocket or purse or other operational context allows for more effective and accurate (or unique) determinations in this regard, notwithstanding variations in the circumstances such as variations in the type of clothing of an operator's pocket (e.g., material, thickness, texture, color, pocket size, etc.) or the presence of other objects (e.g., metal objects, etc.) within a purse. The use of multiple types of different sensory information including differential temperature information in particular enables the mobile device 102 to detect its operational context in circumstances or environments where it might otherwise be difficult to ascertain operational context with a more limited sensing capability. For example, absent the use of other sensor information such as differential temperature information, even if a light sensor was employed on the mobile device, the darkness within a pocket or purse could be readily confused with darkness associated with nighttime or being in a dark room. Also for example, absent the use of other sensor information, even if a touch sensor such as the side touch sensor 119 was employed, metal objects within a purse could be readily confused with pressure arising from human touch. Likewise, absent the use of multiple types of different sensory information, variations in other circumstances (e.g., clothes thickness/variable pocket sizes) could impact accuracy and repeatability in making operational context detections.

Embodiments of the present invention that employ one or more pairs of sensors that allow for sensing temperature differences between different locations on the phone (at which the different sensors of a given pair are located) can be particularly low in cost, simple, and reliable. By using differential temperature sensing, accuracy in terms of measuring actual temperatures is not required, since instead it is differences in temperature (and particularly changes in temperature delta, which are typically small or even miniscule in magnitude) between different locations on the device that are monitored. Through the use of stored information such as that of the look-up table, sensor information or other information, internally-generated hardware heat can be accounted for. In some cases, by virtue of this information (e.g., the information provided by the side touch sensor 119), such internally-generated heat can also be distinguished from other thermal influences such as the heat from a user's fingers/hand as they touch the mobile device 102. The differential temperature sensing capability can be implemented in a simple, cost-effective manner as discussed above, using simple hardware (again, thermo wires/thermocouples, opAmp and an analog-to-digital converter, for instance). As shown above, the implementation of the differential temperature sensors can be done in such a manner as to be consistent with the overall layout of the mobile device (e.g., take a "phone-friendly" implementation), for example, by making use of standard housing features of the mobile device as the temperature sensing plates (e.g., the display bezel, phone logo, etc).

Depending upon the embodiment, the particular sensory information that is considered by the mobile device 102 in predicting its operational context can vary considerably and need not follow the steps discussed above. For example, notwithstanding the particular steps 434-438 and 444-448 discussed above in which various sensory information is considered by the mobile device 102 in determining whether the mobile device is within a pocket, and notwithstanding the particular steps 466-476 discussed above in which various sensory information is considered by the mobile device in determining whether it is within a purse, the particular sensory information (and steps involved in considering such sensory information) can vary depending upon the embodiment of the invention. For example, with respect to FIG. 13, in one alternate embodiment, step 474 is not performed and camera image information is not considered by the mobile device 102, and the process advances immediately to the step 476 upon determining that the mobile device is in a dark environment at the step 472. Also, in another alternate embodiment for example, the step 476 is not performed and isolation is not considered in determining whether the mobile device 102 is within a. purse, and thus the process advances immediately to the step 478 upon determining that the camera image does not indicate that the mobile device is not in a purse at the step 474. Further, in yet another alternate embodiment, neither the step 474 nor the step 476 are performed.

It should be understood that the present invention is intended to encompass a variety of types of temperature sensing devices and configurations thereof in addition to those specifically described above. For example, while serially-connected temperature sensing devices intended to provide voltage outputs were particularly discussed above, it will be understood that in some other embodiments temperature sensing devices providing current outputs can also or instead be used and further that in some other embodiments multiple temperature sensing devices can be coupled in parallel with one another rather than coupled in series. Additionally, it should be also noted that, while the above description particularly relates to embodiments in which differential temperature sensing is implemented on mobile devices, the present invention is also intended to relate to other embodiments, in which differential temperature sensing is implemented on other electronic devices rather than merely mobile devices.

It is specifically intended that the present invention not be limited to the embodiments and illustrations contained herein, but include modified forms of those embodiments including portions of the embodiments and combinations of elements of different embodiments as come within the scope of the following claims.

We claim:

1. An electronic device comprising:
   a plurality of group sensors positioned at a first location, a second location, and a third location, wherein each group sensors includes at least one temperature sensing device at or proximate to the exterior surface of the electronic device;
   an operational amplifier, coupled to the plurality of group sensors, that generates an output signal based on distribution of temperature at the first location, the second location, and the third location;
   a memory device that stores a look-up table having expected thermal difference values corresponding to a plurality of different operation modes of the electronic device, wherein expected thermal difference values in the look-up table indicate different temperature differentials that correspond to an expected measurement based on at least two of the plurality of group sensors; and
   at least one processing device that receives the output signals from the operational amplifier and determines, based at least in part on a current operation mode of the electronic device included in the plurality of different operation modes, an operational context of the electronic device based at least upon the output signal and at least one of the expected thermal difference values stored in the look-up table that corresponds to the current operation mode.

2. The electronic device of claim 1, further comprising an additional sensing device that senses a characteristic other than a temperature and that provides an additional signal indicative of the sensed characteristic, and wherein the at least one processing device determines the operational context of the electronic device additionally based at least in part upon the additional signal.

3. The electronic device of claim 2, wherein the additional sensing device includes a touch sensor and the sensed characteristic is whether the touch sensor is being touched.

4. The electronic device of claim 3, wherein the touch sensor is a side touch sensor positioned along a side edge of the electronic device, wherein the electronic device further includes an accelerometer and a visible light sensor, and wherein the at least one processing device determines the operational context additionally based at least in part upon signals received from the accelerometer and the visible light sensor.

5. The electronic device of claim 3, wherein the exterior surface of the electronic device has a front surface portion, a rear surface portion, and a side edge portion extending between the front and rear surface portions, wherein the first and second locations are respectively at or proximate to the front and rear surface portions, and wherein the touch sensor is arranged along the side edge portion.

6. The electronic device of claim 2, wherein the additional sensing device includes one of a tilt sensor, a vibration sensor, an accelerometer, gyroscope, and a gravitometer.

7. The electronic device of claim 2, wherein the additional sensing device includes one or more of a visible light sensor, an infrared light sensor, a camera, and an electrical/ground isolation sensor.

8. The electronic device of claim 1, further comprising a plurality of additional sensing devices, each of which senses a respective characteristic other than a temperature, and each of which provides a respective signal indicative of the sensed respective characteristic, and wherein the at least one processing device determines the operational context of the electronic device additionally based at least in part upon the respective signals.

9. The electronic device of claim 1, further comprising one or more additional temperature sensing devices each of which provides a respective additional signal indicative of a respective additional temperature experienced at the respective additional temperature sensing device.

10. The electronic device of claim 9, wherein at least one processing device receives each respective additional signal and determines one or more additional temperature differences among the plurality of group sensors and additional temperature sensing devices.

11. The electronic device of claim 9, wherein the plurality of group sensors, and one or more additional temperature sensing devices are connected in series with one another to form a series-connected temperature sensing circuit, and wherein the at least one processing device determines the difference based upon an aggregation of all of the signals provided by the plurality of group sensors and one or more additional temperature sensing devices.

12. The electronic device of claim 1, wherein the plurality of group sensors output either voltages or currents reflective of temperatures experienced by those respective temperature sensing devices, and wherein the plurality of group sensors are either coupled in series with one another or coupled in parallel with one another.

13. The electronic device of claim 1, wherein the electronic device includes a wireless transceiver, the wireless transceiver operational to receive data from a remote sensor, and
   wherein the processing device determines the operational context of the electronic device based at least in part upon the remote sensor data.

14. The electronic device of claim 1, wherein the operational context is determined to be either (a) presence of the electronic device within a pocket, or (b) presence of the electronic device within a purse.

15. The electronic device of claim 1, wherein the electronic device is a mobile device that includes a wireless transceiver, at least one input device, and at least one output device, all of which are coupled to the at least one processing device.

16. The electronic device of claim 1, wherein each respective expected thermal difference value in the lookup table is associated with:
   a first respective value in the lookup table that represents a respective operation mode of the plurality of different operation modes, and
   a second respective value in the lookup table that represents a respective operational context of a plurality of operational contexts.

17. The electronic device of claim 1, wherein the at least one processing device that determines the operational context of the electronic device:
   compares the output signal and the at least one of the expected thermal difference values stored in the look-up table to determine the operational context of the electronic device.

* * * * *